(12) United States Patent
Walker

(10) Patent No.: US 11,804,912 B2
(45) Date of Patent: Oct. 31, 2023

(54) TIME-DIVISION DUPLEX (TDD) ANTENNA SYSTEM

(71) Applicant: Viasat, Inc., Carlsbad, CA (US)

(72) Inventor: Jonathan Walker, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 17/916,787

(22) PCT Filed: Apr. 3, 2020

(86) PCT No.: PCT/US2020/026537
§ 371 (c)(1),
(2) Date: Oct. 3, 2022

(87) PCT Pub. No.: WO2021/201878
PCT Pub. Date: Oct. 7, 2021

(65) Prior Publication Data
US 2023/0163865 A1 May 25, 2023

(51) Int. Cl.
*H04B 17/00* (2015.01)
*H04B 17/14* (2015.01)
*H04B 17/21* (2015.01)

(52) U.S. Cl.
CPC ......... *H04B 17/0085* (2013.01); *H04B 17/14* (2015.01); *H04B 17/21* (2015.01)

(58) Field of Classification Search
CPC ............... H04B 17/00; H04B 17/0082; H04B 17/0085; H04B 17/10; H04B 17/101;
(Continued)

(56) References Cited

U.S. PATENT DOCUMENTS 5,809,395 A * 9/1998 Hamilton-Piercy ........................ H04B 7/2609
725/106
6,710,651 B2 3/2004 Forrester
(Continued)

FOREIGN PATENT DOCUMENTS

WO 2000019753 4/2000
WO 2007108221 9/2007
(Continued)

OTHER PUBLICATIONS

International Search Report and Written Opinion dated Dec. 9, 2020 in PCT International Patent Application No. PCT/US2020/026537.
(Continued)

*Primary Examiner* — Kevin D Mew
(74) *Attorney, Agent, or Firm* — Snell & Wilmer L.L.P.

(57) ABSTRACT

One example includes a self-synchronizing TDD antenna system. The system includes an antenna system to communicate transmit and receive signals and an antenna control circuit coupled to a user communication system. The antenna control circuit includes a transmission line measurement circuit to determine signal loss through a transmission line cable coupled to the antenna system and an amplitude adjustment circuit to adjust amplitude of the transmit and/or receive signals based on the signal loss. A transmit detection circuit monitors signal power of the transmit signal, and a controller switches the amplitude adjustment circuit from a receive mode to a transmit mode in response to the monitored signal power exceeding a predetermined threshold. In the receive mode, the adjustment circuit applies a receive amplitude adjustment to the receive signal, and in the transmit mode the adjustment circuit applies a transmit amplitude adjustment to the transmit signal.

24 Claims, 9 Drawing Sheets

(58) Field of Classification Search
CPC .. H04B 17/102; H04B 17/103; H04B 17/104; H04B 17/11; H04B 17/12; H04B 17/14; H04B 17/20; H04B 17/201; H04B 17/202; H04B 17/21
See application file for complete search history.

(56) References Cited

U.S. PATENT DOCUMENTS

| | | | |
|---|---|---|---|
| 7,123,939 | B1 | 10/2006 | Bird et al. |
| 7,155,257 | B2 | 12/2006 | Bird et al. |
| 7,302,276 | B2 | 11/2007 | Bemhardssen et al. |
| 7,386,284 | B2 | 6/2008 | Thompson |
| 7,664,468 | B2 | 2/2010 | Wong et al. |
| 7,680,462 | B2 | 3/2010 | Wong et al. |
| 8,302,134 | B2 | 10/2012 | Shintani et al. |
| 9,438,292 | B2 | 9/2016 | Sugimoto et al. |
| 9,491,713 | B2 | 11/2016 | Dykyy et al. |
| 10,021,652 | B2 | 7/2018 | Gossner et al. |
| 2002/0042290 | A1* | 4/2002 | Williams ............. H04B 7/1555 455/562.1 |
| 2002/0122465 | A1* | 9/2002 | Agee ...................... H04B 1/707 375/141 |
| 2007/0117515 | A1* | 5/2007 | Sinibaldi ................ H04B 17/21 455/67.11 |
| 2008/0174502 | A1 | 7/2008 | Oren et al. |
| 2011/0269404 | A1 | 11/2011 | Hu et al. |

FOREIGN PATENT DOCUMENTS

| | | | | |
|---|---|---|---|---|
| WO | WO-2018215973 | A1 * | 11/2018 | ............. H03H 11/12 |
| WO | WO-2020072811 | A1 * | 4/2020 | ......... H04B 17/0085 |

OTHER PUBLICATIONS

Written Opinion dated Mar. 16, 2022 in PCT International Patent Application No. PCT/US2020/026537.
International Preliminary Report on Patentability dated Jun. 15, 2022 in PCT International Patent Application No. PCT/US2020/026537.
International Preliminary Report on Patentability dated Oct. 18, 2022 in PCT Application No. PCT/US2020/026537.

* cited by examiner

TIME-DIVISION DUPLEX (TDD) ANTENNA SYSTEM

CROSS-REFERENCE TO RELATED APPLICATIONS

This application is a U.S. national stage entry under 35 U.S.C. § 371 of International Application No. PCT/US2020/026537 filed Apr. 3, 2020, entitled "TIME-DIVISION DUPLEX (TDD) ANTENNA SYSTEM. The foregoing application is hereby incorporated by reference in its entirety (except for any subject matter disclaimers or disavowals, and except to the extent of any conflict with the disclosure of the present application, in which case the disclosure of the present application shall control).

TECHNICAL FIELD

This disclosure relates generally to communication systems, and more specifically to a time-division duplex (TDD) antenna system.

BACKGROUND

An antenna array (or array antenna) is a set of multiple antenna elements that work together as a single antenna to transmit or receive radio waves. The individual antenna elements can be connected to a receiver and/or transmitter by circuitry that applies an appropriate amplitude and/or phase adjustment of signals received and/or transmitted by the antenna elements. When used for transmitting, the radio waves radiated by each individual antenna element combine and superpose with each other, adding together (interfering constructively) to enhance the power radiated in desired directions, and cancelling (interfering destructively) to reduce the power radiated in other directions. Similarly, when used for receiving, the separate received signals from the individual antenna elements are combined with the appropriate amplitude and/or phase relationship to enhance signals received from the desired directions and cancel signals from undesired directions.

SUMMARY

One example includes a self-synchronizing TDD antenna system. The system includes an antenna system to communicate transmit and receive signals and an antenna control circuit coupled to a user communication system. The antenna control circuit includes a transmission line measurement circuit to determine signal loss through a transmission line cable coupled to the antenna system and an amplitude adjustment circuit to adjust amplitude of the transmit and/or receive signals based on the signal loss. A transmit detection circuit monitors signal power of the transmit signal, and a controller switches the amplitude adjustment circuit from a receive mode to a transmit mode in response to the monitored signal power exceeding a predetermined threshold. In the receive mode, the adjustment circuit applies a receive amplitude adjustment to the receive signal, and in the transmit mode the adjustment circuit applies a transmit amplitude adjustment to the transmit signal.

Another example includes a method for communicating at least one of a transmit signal and a receive signal via a time-division duplex (TDD) antenna communication system comprising an antenna system. The method includes providing a calibration signal from an antenna control circuit to the antenna system on at least one transmission line cable and receiving a returned signal corresponding to the calibration signal retransmitted back from the antenna system to the antenna control circuit on the at least one transmission line cable. The method also includes determining signal loss between the antenna system and the antenna control circuit through the at least one transmission line cable based on the returned signal and adjusting an amplitude of the receive signal received via the at least one transmission line cable in the receive mode based on the determined signal loss. The method also includes monitoring signal power of the transmit signal obtained from the user communication system and switching an amplitude adjustment circuit from the receive mode to a transmit mode in response to the monitored signal power exceeding a predetermined threshold. The method further includes adjusting an amplitude of the transmit signal in the transmit mode based on the determined signal loss.

DETAILED DESCRIPTION

Figure 1:
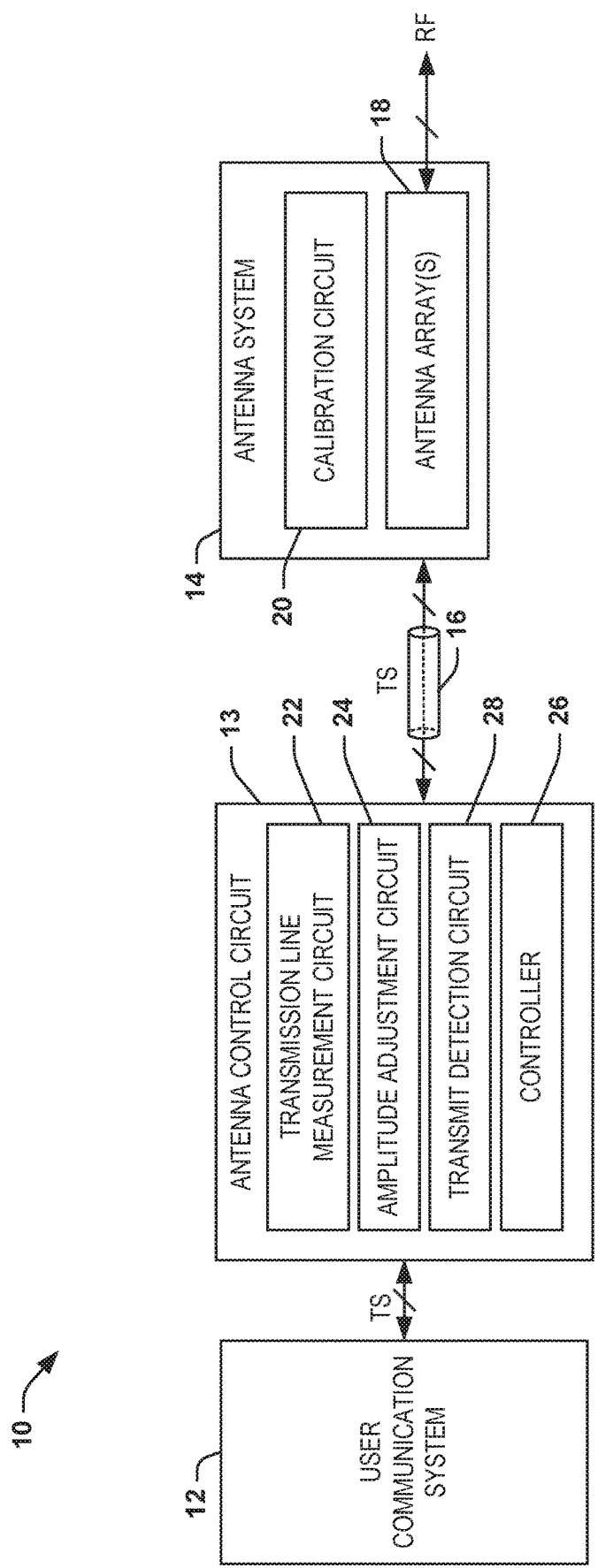
FIG. 1 illustrates an example of a communication system.

This disclosure relates generally to communication systems, and more specifically to a time-division duplex (TDD) antenna system. A communication system can be implemented that includes a user communication system and an antenna system. As an example, the communication system can be implemented as a wireless broadband communication system, such as using a Long Term Evolution (LTE) communication standard. The antenna system can be physically communicatively coupled (e.g., via a set of transmission line cable) to an antenna control circuit that is coupled to the user communication system to provide enhanced wireless communication capability for the communication system, such as to provide wireless extension or capability of the user communication system to communicate with a base station (e.g., in a time-division duplex (TDD) manner). For example, the antenna system can provide wireless communication capability for the user communication system based on the user communication system being located in a location that prohibits or impedes wireless connection to a base station based on, for example, intervening physical barriers or extreme range.

The antenna system includes one or more antenna arrays and a calibration circuit. The antenna array(s) can be arranged as any of a variety of antenna arrays to provide a respective one or more wireless signals to be transmitted from and/or received at the antenna system. For example, the antenna array(s) can include an arrangement of antenna elements (e.g., strip-line conductors) to provide signal diversity between two or more respective signal paths, such as based on polarization diversity (e.g., orthogonal polarizations of two separate signal paths), The antenna array(s) can thus each transmit signal(s) and receive signal(s), such as in a TDD manner based on a defined standard on which the user communication system operates.

As described herein, the antenna control circuit can determine cable losses of the interconnection between the antenna system and the user communication system, such as in a calibration procedure. As a result, the antenna control circuit can be implemented to provide attenuation of transmitted signals (hereinafter "transmit signals") provided from the user communication system via the antenna array(s) in a manner that allows the transmit signals be transmitted at or below a predetermined effective isotropic radiated power (EIRP), such as defined by the operating standard of the user communication system. Additionally, as also described herein, the antenna control circuit can be configured to monitor signal power on the respective communication paths to facilitate the TDD operation of the communication system without any input from the user communication system. As a result, the antenna system can be installed to cooperate with the user communication system in a manner that is substantially agnostic of the interconnection between the antenna control circuit and the antenna system, and without active communication between the antenna system and the user communication system.

FIG. 1 illustrates an example of a communication system 10. The communication system 10 can be implemented as a wireless broadband communication system, such as using a Long Term Evolution (LTE) communication standard. In the example of FIG. 1, the communication system 10 includes a user communication system 12, an antenna control circuit 13, and an antenna system 14. As an example, the user communication system 12 can correspond to a wireless gateway, such as to facilitate wireless communications (e.g., Wi-Fi, Bluetooth, and/or cellular communication) between one or more user devices and a wireless network, such as a cellular network or other wide-area network (WAN).

In the example of FIG. 1, the antenna system 14 is communicatively coupled to an antenna control circuit 13 via at least one transmission line cable 16 (e.g., an RG6 cable), such that the antenna control circuit 13 interconnects the user communication system 12 (e.g., via additional transmission line cable(s)) and the antenna system 14. As an example, the antenna. system 14 can provide enhanced wireless communication capability for the user communication system 12, such as to provide wireless extension or capability of the user communication system 12 to communicate with a base station (e.g., in a time—division duplex (TDD) manner) For example, the antenna system 14 can provide wireless communication capability for the user communication system 12 based on the user communication system 12 being located in a location that prohibits or impedes wireless connection to a base station based on, for example, intervening physical harriers or extreme range.

The antenna system 14 includes one or more antenna arrays 18 and a calibration circuit 20. The antenna array(s) 18 can be arranged as any of a variety of antenna arrays to provide a respective one or more wireless signals to be transmitted from and/or received at the antenna system 14. For example, the antenna array(s) 18 can include an arrangement of antenna elements (e.g., strip-line conductors) to provide signal diversity between two or more respective signal paths, such as based on polarization diversity. For example, the antenna array(s) 18 can include two separate arrays of orthogonally polarized antenna elements to provide orthogonal polarizations of signals propagating in two separate respective signal paths between the user communication system 12 and the antenna system 14 through the antenna control circuit 13. The antenna array(s) 18 can thus each transmit signal(s) and receive signal(s), such as bidirectionally in a TDD manner based on a defined standard on which the user communication system 12 operates. In the example of FIG. 1, signals transmitted from and received at the antenna array(s) 18 are demonstrated as signals "RF", and the same signals propagating bidirectionally along the transmission line cable(s) 16 are demonstrated as signals "TS".

The antenna control circuit 13 includes a transmission line measurement circuit 22 and an amplitude adjustment circuit 24. The transmission line measurement circuit 22 is configured to determine a signal loss between the antenna system 14 and the antenna control circuit 13 through the at least one transmission line cable 16. For example, during installation of the antenna system 14 and/or periodically thereafter, the transmission line measurement circuit 22 can initiate a calibration operation (e.g., in response to a calibration command). As an example, during the calibration operation, the transmission line measurement circuit 22 can be configured to generate a calibration signal, such as a radio frequency (RF) signal, that can be transmitted to the antenna system 14 from the antenna control circuit 13 via the transmission line cable(s) 16, such that the calibration signal can be retransmitted back to the antenna control circuit 13 from the antenna system 14 via the transmission line cable(s) 16. As a result, the transmission line measurement circuit 22 can measure at least one characteristic of the return signal (e.g., power) to determine signal loss exhibited by the transmission line cable(s) 16.

In response to determining the signal loss, the amplitude adjustment circuit 24 can be configured to adjust an amplitude of at least one of transmit signals transmitted from the antenna system 14 and receive signals received at the antenna, system 14 based on the determined signal loss. As described herein, the term "transmit signals" refers to signals that are originated at the user communication system 12, propagate through the transmission line cable(s) 16 as a signal TS, and are transmitted from the antenna system 14 via the antenna array(s) 18 as a signal RF. Similarly, the term "receive signals" refers to signals that are received at the antenna system 14 via the antenna array(s) 18 as a signal RF, propagate through the transmission line cable(s) 16 as a signal TS, and are provided to the user communication system 12. The amplitude adjustment circuit 24 can therefore adjust the amplitude of the transmit and receive signals in separate respective signal paths in the antenna control circuit 13 based on the signal loss determined during the calibration operation.

For example, the communication system 10 can be configured to operate based on a predetermined communication standard that can dictate a predetermined maximum effective isotropic radiated power (EIRP), such as +23 dBm for the transmit signals. As an example, the amplitude adjustment circuit 24 can include one or more variable circuit elements (VCEs) to amplify or attenuate the transmit signals (e.g., down to less than the predetermined maximum EIRP) and/or the receive signals (e.g., down to less than a maximum saturation power associated with the antenna control circuit 13 and/or the user communication system 12). For example, the antenna array(s) 18 can be designed with sufficient gain, or the antenna control circuit 13 can be sufficiently high gain to provide the transmit signals at a power level that is greater than the predetermined maximum EIRP (e.g., to overcome power losses of the transmission line cable(s) 16 regardless of the length of the transmission line cable(s) 16), such that the transmit signals can be attenuated down to approximately the predetermined maximum EIRP. Therefore, the antenna system 14 can be installed in a manner that is substantially agnostic of the length and/or loss characteristics of the transmission line cable(s) 16 based on the calibration operation to determine the signal loss of the transmission line cable(s) 16.

In the example of FIG. 1, the antenna control circuit 13 also includes a transmit detection circuit 28 and a controller 26. As described previously, the communication system 10 can operate based on a TDD communication standard, such that the transmit signals and the receive signals can be interleaved with each other on a given signal path between the user communication system 12 and the antenna array(s) 18. The transmit detection circuit 28 can be configured to measure power on a given signal path in the antenna control circuit 13 to determine if user communication system 12 is transmitting a transmit signal. Therefore, in response to determining if the user communication system 12 is transmitting a transmit signal, the controller 26 can switch the adjustment circuit 24 from a receive mode (e.g., as a default mode) to a transmit mode to facilitate transmission of the transmit signal from the antenna system 14 via the antenna array(s) 18. Additionally, in response to the transmit detection circuit 28 detecting a decrease in the power of the signal path (e.g., less than the predetermined threshold), the controller 26 can switch the adjustment circuit 24 back to the receive mode from the transmit mode (e.g., upon expiration of a timer).

In response to the transmit detection circuit 28 determining that the user communication system 12 is transmitting a transmit signal, such as based on the power on the signal path being greater than a predetermined threshold, the controller 26 can provide a signal to the amplitude adjustment circuit 24 to switch the signal path from a receive mode to a transmit mode. Therefore, the amplitude adjustment circuit 24 can provide the appropriate amplitude adjustment to the transmit signal (e.g., via a VCE) to facilitate transmission of the transmit signal from the antenna system 14 via the antenna array(s) 18. As an example, the amplitude adjustment circuit 24 can include power amplifier and/or a filter in each of the transmit and receive switchable portions of the signal path, and/or can include a short-circuit bypass path in one of the transmit and receive signal paths.

As a result, the antenna system 14 can operate to facilitate the bidirectional TDD communications between transmit and receive signals without requiring communication or signal transfer from the user communication system 12. Therefore, the antenna system 14 can be installed in a simplistic manner that is largely independent of the operation of the user communication system 12. Additionally, as previously described, the antenna system 14 can be installed in a manner that is agnostic of the length of the transmission line cable(s) 16 interconnecting the antenna system 14 and the antenna control circuit 13. Accordingly, and as described in greater detail herein, the antenna system 14 can be simplistically installed to efficiently facilitate wireless communication between the user communication system 12 and a network hub (e.g., a base station)

Figure 2:
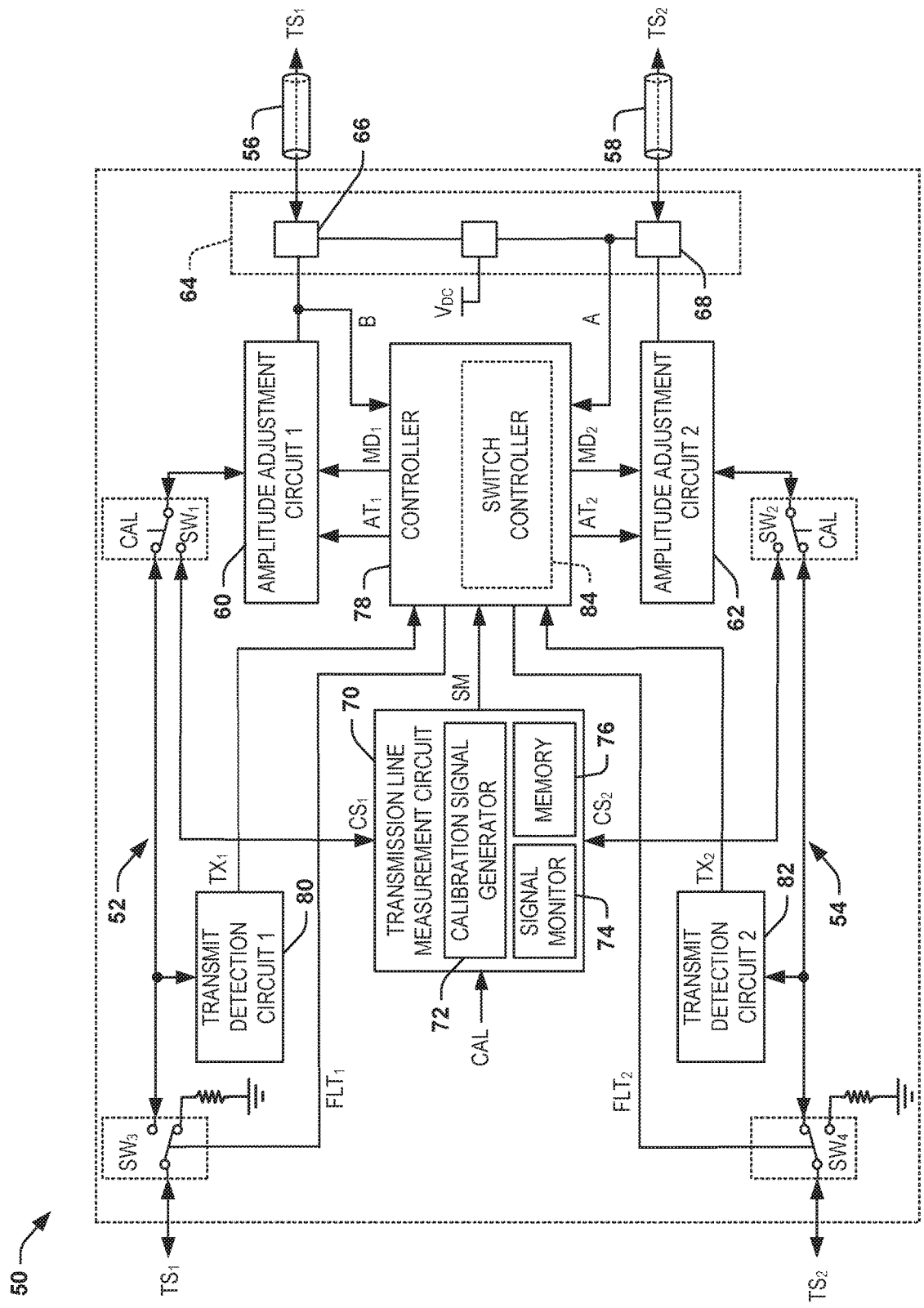
FIG. 2 illustrates an example of an antenna control circuit.

FIG. 2 illustrates an example of an antenna control circuit 50. The antenna control circuit 50 can correspond to the antenna control circuit 13 in the example of FIG. 1. Therefore, reference is to be made to the example of FIG. 1 in the following description of the example of FIG. 2.

The antenna control circuit 50 is demonstrated in the example of FIG. 2 as including a first signal path 52 and a second signal path 54 that can each correspond to a separate signal diversity type, as described in greater detail herein. Additionally, the antenna control circuit 50 is communicatively coupled to the antenna system (e.g., the antenna system 14) via a first transmission line cable 56 configured to propagate a signal $TS_1$ between the antenna system and the antenna control circuit 50 and a second transmission line cable 58 configured to propagate a signal $TS_2$ between the antenna system and the antenna control circuit 50. For example, the transmission line cables 56 and 58 can be connected to a calibration circuit (e.g., the calibration circuit 20) that is coupled to the antenna system. The transmission line cables 56 and 58 can each be associated with the respective signal diversity types, and thus the respective signal paths of the antenna control circuit 50. For example, the transmission line cables 56 and 58 can be configured as RG6 cables or other types of transmission line cables.

In the example of FIG. 2, the antenna control circuit 50 includes a first amplitude adjustment circuit 60 that is provided in the first signal path 52 and a second amplitude adjustment circuit 62 that is provided in the second signal path 54. As an example, the amplitude adjustment circuits 60 and 62 can each include at least one variable circuit element (VCE) in the respective signal paths 52 and 54. For example, the VCEs can be configured as variable attenuators, variable gain amplifiers, and/or fixed gain amplifiers. As described in greater detail herein, the amplitude adjustment circuits 60 and 62 can provide amplification (e.g., attenuation) of the signals $TS_1$ and $TS_2$. As described herein, the term "amplification" can refer to adjusting the signals $TS_1$ and $TS_2$ with a positive gain or a negative gain. As an example, the gain can be set to zero as a bypass condition (e.g., for receive signals $TS_1$ and $TS_2$). In the example of FIG. 2, the signals $TS_1$ and $TS_2$ are provided to the respective amplitude adjustment circuits 60 and 62 via through a first switch $SW_1$ and a second switch $SW_2$, respectively.

In the example of FIG. 2, the antenna control circuit 50 includes a power block 64 interconnecting the amplitude adjustment circuits 60 and 62 and the transmission line cables 56 and 58. The power block 64 is configured to generate or receive a DC voltage $V_{DC}$. As an example, the voltage $V_{DC}$ can have an amplitude that varies between a normal operating mode and a calibration mode. For example, the power block 64 can be configured as a low-dropout (LDO) voltage regulator, such as to generate the DC voltage $V_{DC}$ from a higher input voltage. The power block 64 provides the DC voltage $V_{DC}$ to a first injection circuit 66 and a second injection circuit 68. For example, the injection circuits 66 and 68 can be configured as bias-tees. The injection circuits 66 and 68 are each coupled to the transmission line cables 56 and 58 on which the transmit and receive signals $TS_1$ and $TS_2$, respectively, are propagated. Therefore, the injection circuits 66 and 68 are configured to provide the DC voltage $V_{DC}$ onto the transmission line cables 56 and 58 to the antenna system for control of associated electronics (e.g., switches) in the antenna system.

The antenna control circuit 50 also includes a transmission line measurement circuit 70. The transmission line measurement circuit 70 is configured to determine a signal loss between the user communication system and the antenna control circuit 50 through the transmission line cables 56 and 58. For example, during installation of the associated antenna system and/or periodically thereafter, the transmission line measurement circuit 70 can initiate a calibration operation in response to a calibration command CAL. As an example, the calibration command CAL can be provided in response to a user input, such as via a physical input on the antenna control circuit 50 or the calibration system 20 (e.g., a physical button or a button on a touchscreen), in response to power-up of the antenna control circuit 50 (e.g., automatically in response to initially receiving the voltage $V_{DC}$), periodically from a processor or controller device (e.g., at periodic or programmable intervals), or from any of a variety of other means. As a further example, the calibration command CAL can be initiated in response to a change in the DC voltage $V_{DC}$, or can be initiated via tone signaling on the signals $TS_1$ and $TS_2$.

In the example of FIG. 2, the transmission line measurement circuit 70 includes a calibration signal generator 72, a signal monitor 74, and a memory 76. The transmission line measurement circuit 70 is communicatively coupled to the first amplitude adjustment circuit 60 through the first switch $SW_1$ and to the second amplitude adjustment circuit 62 through the second switch $SW_2$. In the example of FIG. 2, the switches $SW_1$ and $SW_2$ are demonstrated as being set to a normal operating mode state, and are controlled via the calibration command CAL. Therefore, in the normal operating mode, as in the state demonstrated in the example of FIG. 2, the switch $SW_1$ connects the first amplitude adjustment circuit 60 to the first signal path 52 to receive the signal $TS_1$, and and the switch $SW_2$ connects the second amplitude adjustment circuit 62 to the second signal path 54 to receive the signal $TS_2$. Therefore, in the normal operating mode, the switches $SW_1$ and $SW_2$ can facilitate propagation of the transmit and receive signals between the user communication system and the antenna system via the respective signal paths 52 and 54 and the respective transmission line cables 56 and 58. However, in a calibration mode, such as initiated by the calibration command CAL, the switches $SW_1$ and $SW_2$ can be switched to coupling the amplitude adjustment circuits 60 and 62 to the transmission line measurement circuit 70 to facilitate the calibration operation.

During the calibration operation, the calibration signal generator 72 can be configured to generate a calibration. signal, such as a dummy RF signal having a predefined frequency. In the example of FIG. 2, the calibration signal is demonstrated as a first calibration signal $CS_1$ and a second calibration signal $CS_2$ corresponding, respectively, to the first and second transmission line cables 56 and 58 via the amplitude adjustment circuits 60 and 62. The transmission line measurement circuit 70 can thus transmit one or both of the calibration signals $CS_1$ and $CS_2$ to the antenna system via the respective one of the transmission line cables 56 and 58.

The antenna system can be configured to retransmit the calibration signal(s) $CS_1$ and/or $CS_2$ back to the antenna control circuit 50 from the antenna system as respective return signal(s) via the transmission line cables 56 and 58 during the calibration procedure. In response to receiving the return signal(s), the signal monitor 74 can be configured to measure at least one characteristic of the return signal(s) to determine signal loss exhibited by the transmission line cables 56 and 58. For example, the characteristic of the return signal can be power, such that the signal monitor 74 can calculate a power ratio between one of the calibration signals $CS_1$ and $CS_2$ and the respective return signal. Accordingly, the signal monitor 74 can determine the signal loss exhibited by the transmission line cable(s) 62 and 64 based on the power ratio between the calibration signal(s) $CS_1$ and $CS_2$ and the respective return signal. Additionally, other types of characteristics can be monitored instead of or in addition to power, such as delay time, to determine the signal loss exhibited by the transmission line cable(s) 62 and 64. The transmission line measurement circuit 70 can then store the determined signal loss in the memory 76. For example, the memory 76 can store signal loss information for both of the transmission line cables 56 and 58 individually or in combination, and can store the signal loss information for each calibration operation or for the most recent calibration operation. As an example, the memory 76 can be configured as a non-volatile memory, such that the memory 76 can retain the calculated signal loss information during power loss of the antenna control circuit 50. As a result, the calculated signal loss can be retrieved from the memory 76 after power is returned to the antenna control circuit 50 to facilitate operation of the antenna control circuit 50 without the need for a calibration operation.

Figure 3:
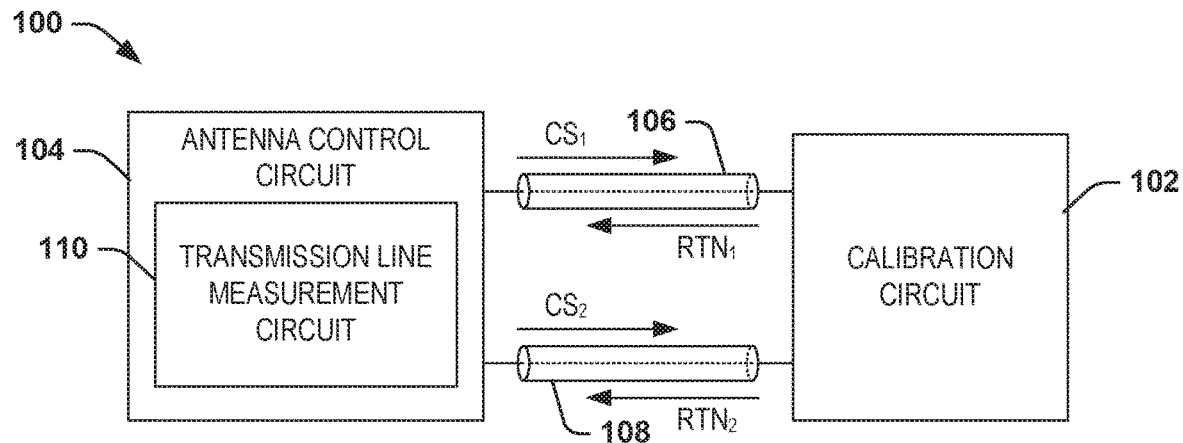
FIG. 3 illustrates an example diagram of calibration of a communication system.
Figure 4:
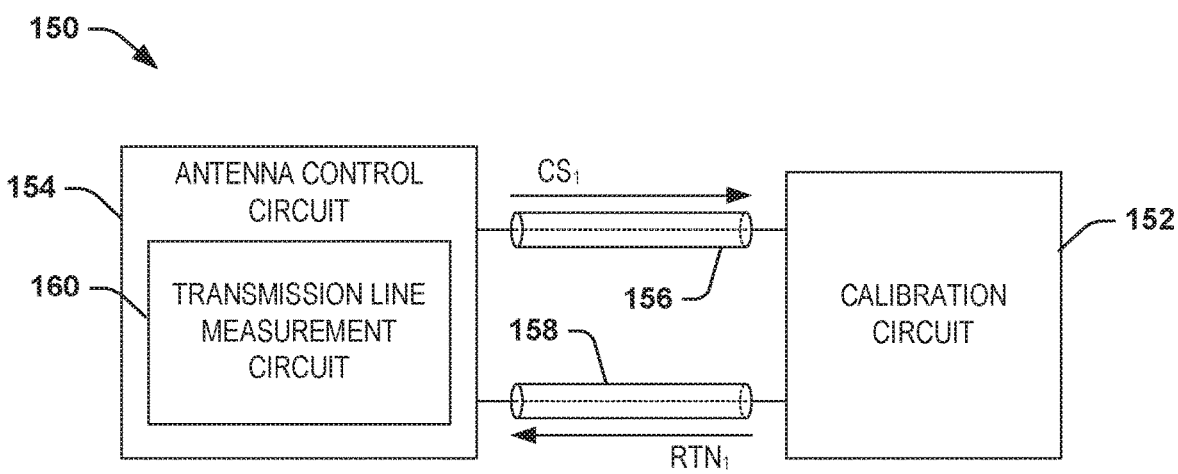
FIG. 4 illustrates another example diagram of calibration of a communication system.

FIGS. 3 and 4 illustrate example diagrams 100 and 150, respectively, of calibration of a communication system. In the example of FIG. 3, the communication system includes a calibration circuit 102 and an antenna control circuit 104 that are communicatively coupled by a first transmission line cable 106 and a second transmission line cable 108. In the example of FIG. 4, the communication system includes a calibration circuit 152 and an antenna control circuit 154 that are communicatively coupled by a first transmission line cable 156 and a second transmission line cable 158. The calibration circuits in the examples of FIGS. 3 and 4 can each correspond to the calibration circuit 20 in the example of FIG. 1, such as included in the antenna system 14. As an example, the calibration circuits 102 and 152 can correspond to the calibration circuit 20, the antenna control circuits 104 and 154 can correspond to the antenna control circuits 13 and/or 50, and the transmission line cables 106 and 108 and the transmission line cables 156 and 158 can correspond to the transmission line cable(s) 16 and/or the transmission line cables 56 and 58. Therefore, reference is to be made to the examples of FIGS. 1 and 2 in the following description of the examples of FIGS. 3 and 4.

In the diagram 100, the antenna control circuit 104 includes a transmission line measurement circuit 110. During the calibration operation, the transmission line measurement circuit 110 can be configured (e.g., via the calibration signal generator 72) to generate a first calibration signal $CS_1$ that is transmitted by the transmission line measurement circuit 110 along the first transmission line cable 106. The calibration circuit 102 can be configured to retransmit (e.g., reflect) the calibration signal $CS_1$ back to the antenna control circuit 104 as a respective return signal $RTN_1$ via the first transmission line cable 106. Therefore, in the diagram 100, the first transmission line 106 is configured to propagate both the calibration signal $CS_1$ and the reflected return signal $RTN_1$. In response to receiving the return signal $RTN_1$, the transmission line measurement circuit 110 can be configured (e.g., via the signal monitor 74) to measure the at least one characteristic of the reflected return signal $RTN_1$ to determine the signal loss exhibited by the first transmission line cable 106. For example, the characteristic of the reflected return signal $RTN_1$ can be power, such that the transmission line measurement circuit 110 can calculate a power ratio between the calibration signal $CS_1$ and the respective reflected return signal $RTN_1$ to determine the signal loss exhibited by the first transmission line cable 106.

Similarly, the transmission line measurement circuit 110 can repeat the previously described calibration procedure with respect to the second transmission line cable 108. For example, the transmission line measurement circuit 110 can also be configured to generate a second calibration signal $CS_2$ that is transmitted by the transmission line measurement circuit 110 along the second transmission line cable 108. The calibration circuit 102 can be configured to retransmit (e.g., reflect) the calibration signal $CS_2$ back to the antenna control circuit 104 as a respective return signal $RTN_2$ via the second transmission line cable 108. In response to receiving the reflected return signal $RTN_2$, the transmission line measurement circuit 110 can be configured (e.g., via the signal monitor 74) to measure the at least one characteristic of the reflected return signal $RTN_2$ to determine the signal loss exhibited by the second transmission line cable 108, similar to as described previously with respect to the first transmission line cable 106.

In the diagram 150, the antenna control circuit 154 includes a transmission line measurement circuit 160. During the calibration operation, the transmission line measurement circuit 160 can be configured (e.g., via the calibration signal generator 72) to generate a first calibration signal $CS_1$ that is transmitted by the transmission line measurement circuit 160 along the first transmission line cable 156. The calibration circuit 152 can be configured to retransmit the calibration signal $CS_1$ back to the antenna control circuit 154 as a respective return signal $RTN_1$ via the second transmission line cable 158. Therefore, in the diagram 150, the first transmission line 156 is configured to propagate the calibration signal $CS_1$ and the second transmission line cable 158 is configured to propagate the return signal $RTN_1$. In response to receiving the return signal $RTN_1$, the transmission line measurement circuit 160 can be configured (e.g., via the signal monitor 74) to measure the at least one characteristic of the return signal $RTN_1$ to determine the signal loss exhibited by the first and second transmission line cables 156 and 158. For example, the characteristic of the return signal $RTN_1$ can be power, such that the transmission line measurement circuit 160 can calculate a power ratio between the calibration signal $CS_1$ and the respective return signal $RTN_1$ to determine the signal loss exhibited by the first and second transmission line cables 156 and 158. As an example, the transmission line measurement circuit 160 can either conclude the calibration operation, or can repeat the previously described calibration procedure with respect to switching the first and second transmission line cables 156 and 158 with respect to transmission of the calibration signal CS and receipt of the return signal RTN.

Figure 5:
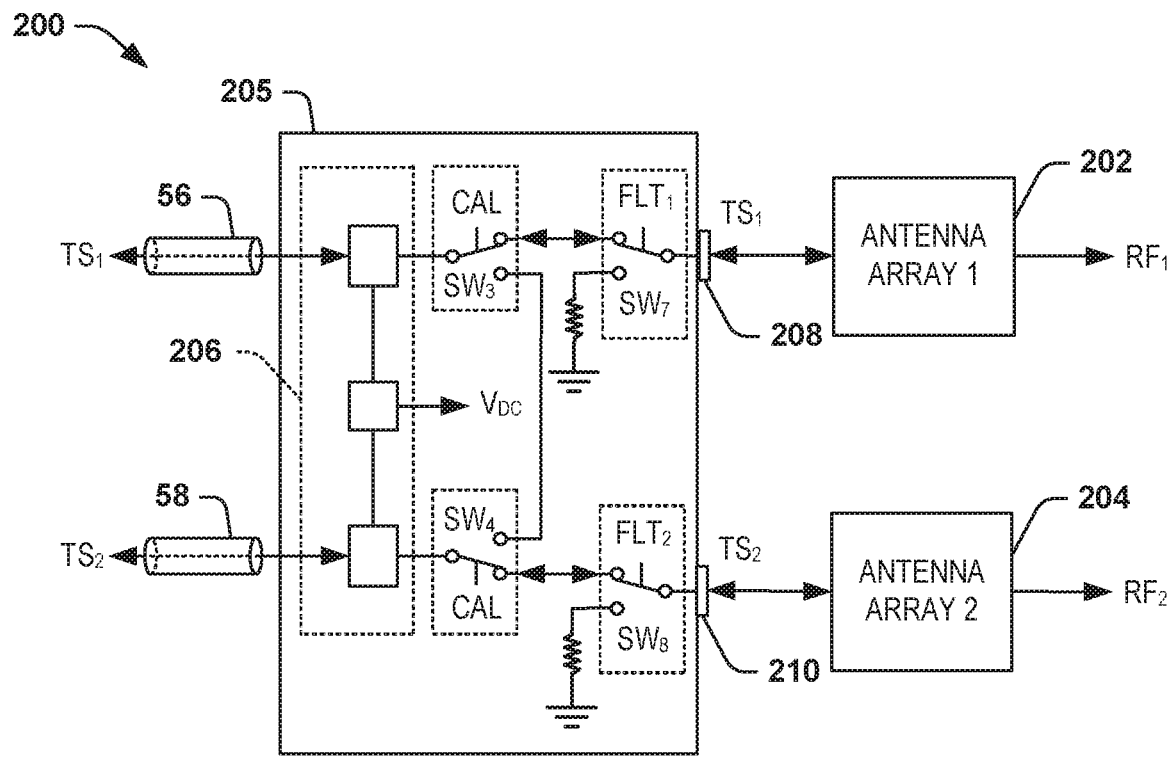
FIG. 5 illustrates an example of a calibration circuit.

FIG. 5 illustrates an example of an antenna system 200. The antenna system 200 can correspond to the antenna system 14 of the example of FIG. 1. Therefore, reference is to be made to the example of FIG. 1 in the following description of the example of FIG. 5.

The antenna system 200 includes a first antenna array 202 and a second antenna array 204 that can each be associated with the respective signal diversity types. The antenna arrays 202 and 204 can be arranged as any of a variety of antenna arrays to provide a respective one or more wireless signals to be transmitted from and/or received at the antenna system 200, demonstrated as respective signals $RF_1$ and $RF_2$. For example, the antenna arrays 202 and 204 can include an arrangement of antenna elements (e.g., strip-line conductors) to provide the signal diversity between the two respective signal paths, such as based on polarization diversity. As an example, the antenna arrays 202 and 204 can be configured as separate respective arrays of orthogonally polarized antenna elements to provide orthogonal polarizations of signals propagating in the respective signal paths. The antenna arrays 202 and 204 can thus each transmit and receive signals in a TDD manner based on a defined standard on which the user communication system operates.

The antenna system 200 also includes a calibration circuit 205, such as corresponding to the calibration circuit 20 in the example of FIG. 1. The calibration circuit 205 includes an extraction circuit 206 that can be configured as a DC decoupler (e.g., a bias—tee) that is coupled to the transmission line cables 56 and 58 to extract a DC voltage, demonstrated as a voltage $V_{DC}$, that is provided, such as from the power block 64, to power the electronics of the antenna system 200. For example, the DC voltage $V_{DC}$ can be a DC bias voltage that is provided on the transmission line cables 56 and 58, such that the extraction circuit 206 extracts the voltage $V_{DC}$ to provide power to the electronic components of the antenna system 200. Therefore, the antenna system 200 does not require a local power source, such that the antenna system 200 can be installed in a more flexible manner.

The calibration circuit 205 includes a first signal port 208 and a second signal port 210 that are coupled to the antenna control circuit 50. The first signal port 208 is configured to propagate the transmit and receive signals $TS_1$ via the transmission line cable 56 and the second signal port 210 is configured to propagate the transmit and receive signals $TS_2$ via the transmission line cable 58. The first signal port 208 is coupled to the first transmission line cable 56 via a first switch $SW_3$ associated with the calibration circuit 205 and the second signal port 210 is coupled to the second transmission line cable 58 via a second switch $SW_4$ associated with the calibration circuit 205. In the example of FIG. 5, the switches $SW_3$ and $SW_4$ are demonstrated as being set to a normal operating mode state, and are controlled via the calibration command CAL. For example, the calibration command CAL can correspond to the same calibration command CAL described in the example of FIG. 2, or can be a different calibration command (e.g., facilitated by a user or a change in operational DC voltage) that is to be provided during the calibration operation.

Therefore, in the normal operating mode, as in the state demonstrated in the example of FIG. 5, the switch $SW_3$ connects the first signal port 208 to the first transmission line cable 56 and the switch $SW_4$ connects the second signal port 210 to the second transmission line cable 58 to facilitate propagation of the transmit and receive signals between the antenna control circuit 50 and the antenna system 200 via the respective transmission line cables 56 and 58. However, in the calibration mode, such as initiated by the calibration command CAL, the switches $SW_3$ and $SW_4$ can be switched to provide a short circuit between the transmission line cables 56 and 58. As a result, the calibration signal $CS_1$, such as provided in the example of FIG. 4, can be provided from the first transmission line cable 56 and can be retransmitted back to the antenna control circuit 50 as the return signal $RTN_1$ along the second transmission line cable 58. Therefore, with minimal input, the antenna system 200 can be implemented in the calibration operation to determine the signal loss of the transmission line cables 56 and 58.

Figure 6:
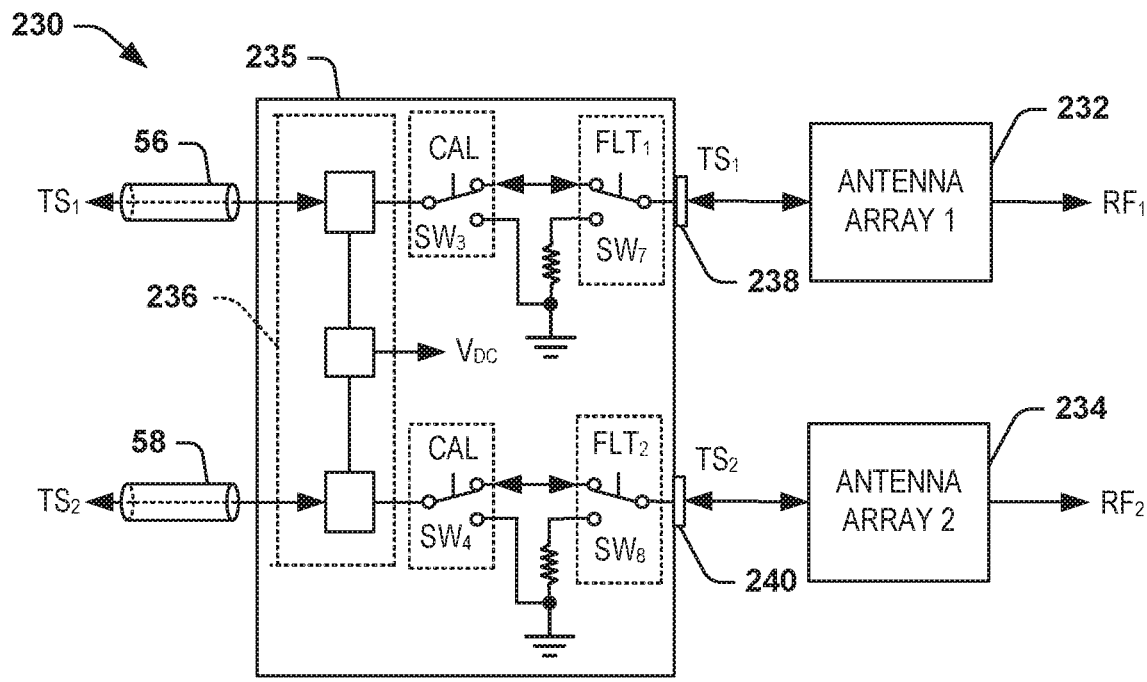
FIG. 6 illustrates another example of a calibration circuit.

FIG. 6 illustrates an example of an antenna system 230. The antenna system 230 can correspond to the antenna system 14 of the example of FIG. 1. Therefore, reference is to be made to the example of FIG. 1 in the following description of the example of FIG. 6.

The antenna system 230 includes a first antenna array 232 and a second antenna array 234 that can each be associated with the respective signal diversity types. The antenna arrays 232 and 234 can be arranged as any of a variety of antenna arrays to provide a respective one or more wireless signals to be transmitted from and/or received at the antenna system 230, demonstrated as respective signals $RF_1$ and $RF_2$. For example, the antenna arrays 232 and 234 can include an arrangement of antenna elements (e.g., strip-line conductors) to provide the signal diversity between the two respective signal paths, such as based on polarization diversity. As an example, the antenna arrays 232 and 234 can be configured as separate respective arrays of orthogonally polarized antenna elements to provide orthogonal polarizations of signals propagating in the respective signal paths. The antenna arrays 232 and 234 can thus each transmit and receive signals in a TDD manner based on a defined standard on which the user communication system operates.

The antenna system 230 also includes a calibration circuit 235, such as corresponding to the calibration circuit 20 in the example of FIG. 1. The calibration circuit 235 includes an extraction circuit 236 that can be configured as a DC decoupler (e.g., a bias-tee) that is coupled to the transmission line cables 56 and 58 to extract a DC voltage, demonstrated as a voltage $V_{DC}$, that is provided, such as from the power block 64, to power the electronics of the antenna system 230. For example, the DC voltage $V_{DC}$ can be a DC bias voltage that is provided on the transmission line cables 56 and 58, such that the extraction circuit 236 extracts the voltage $V_{DC}$ to provide power to the electronic components of the antenna system 230. Therefore, the antenna system 230 does not require a local power source, such that the antenna system 230 can be installed in a more flexible manner.

The antenna system 230 includes a first signal port 238 and a second signal port 240 that are coupled to the antenna control circuit 50. The first signal port 238 is configured to propagate the transmit and receive signals $TS_1$ via the transmission line cable 56 and the second signal port 240 is configured to propagate the transmit and receive signals $TS_2$ via the transmission line cable 58. The first signal port 238 is coupled to the first transmission line cable 56 via a first switch $SW_3$ associated with the calibration circuit 235 and the second signal port 240 is coupled to the second transmission line cable 58 via a second switch $SW_4$ associated with the calibration circuit 235. In the example of FIG. 5, the switches $SW_3$ and $SW_4$ are demonstrated as being set to a normal operating mode state, and are controlled via the calibration command CAL. For example, the calibration command CAL can correspond to the same calibration command CAL described in the example of FIG. 2, or can be a different calibration command (e.g., facilitated by a user) that is to be provided during the calibration operation.

Therefore, in the normal operating mode, as in the state demonstrated in the example of FIG. 6, the switch $SW_3$ connects the first signal port 238 to the first transmission line cable 56 and the switch $SW_4$ connects the second signal port 240 to the second transmission line cable 58 to facilitate propagation of the transmit and receive signals between the antenna control circuit 50 and the antenna system 230 via the respective transmission line cables 56 and 58. However, in the calibration mode, such as initiated by the calibration command CAL, the switches $SW_3$ and $SW_4$ can be switched to couple each of the transmission line cables 56 and 58 to ground. As a result, the calibration signal $CS_1$, such as provided in the example of FIG. 3, can be provided from the first transmission line cable 56 and can be reflected back to the antenna control circuit 50 as the return signal $RTN_1$ along the first transmission line cable 56. Similarly, the calibration signal $CS_2$, such as provided in the example of FIG. 3, can be provided from the second transmission line cable 58 and can be reflected back to the antenna control circuit 50 as the return signal $RTN_2$ along the second transmission line cable 58. Therefore, with minimal input, the calibration circuit 235 can be implemented in the calibration operation to determine the signal loss of the transmission line cables 56 and 58.

Figure 7:
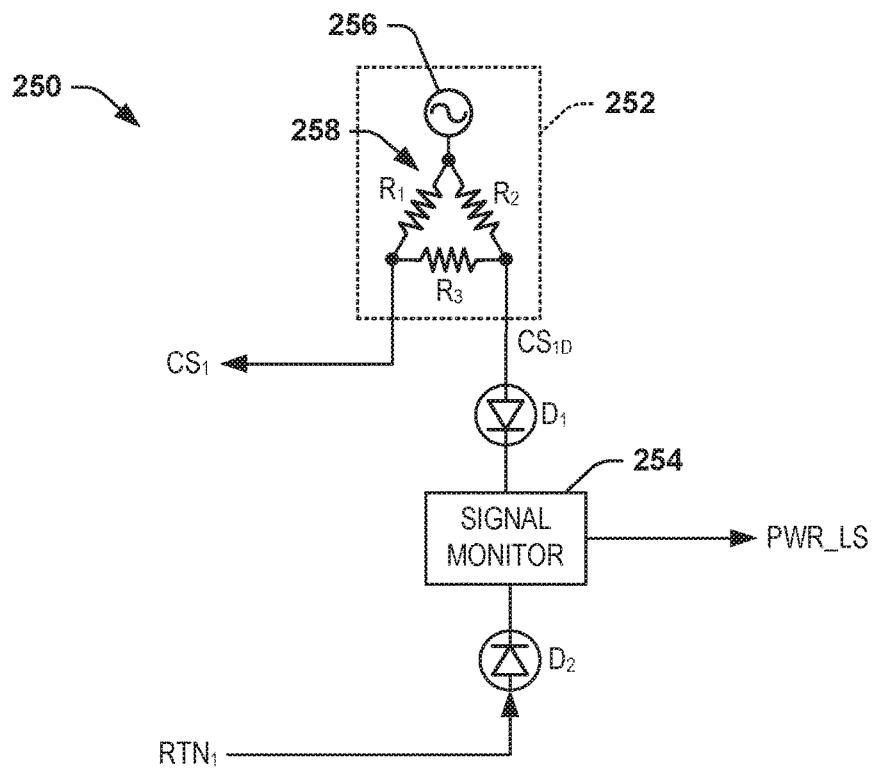
FIG. 7 illustrates an example of a transmission line measurement circuit.

FIG. 7 illustrates an example of a transmission line measurement circuit 250. The transmission line measurement circuit 250 can correspond to the transmission line measurement circuit 70 in the example of FIG. 2. Therefore, reference is to be made to the examples of FIGS. 2-6 in the following description of the example of FIG. 7.

As described previously, the transmission line measurement circuit 250 is configured to determine a signal loss between the antenna system (e.g., the antenna system 14, or one of the antenna systems 200 and 230) and the antenna control circuit 50 through the transmission line cables 56 and 58. In the example of FIG. 7, the transmission line measurement circuit 250 includes a calibration signal generator 252 and a signal monitor 254. The calibration signal generator 252 includes an RF signal source 256 that is configured to generate a calibration signal that can correspond to the first calibration signal $CS_1$. As an example, the first calibration signal $CS_1$ can correspond to a dummy RF signal (e.g., a sinusoidal signal) having a predefined frequency. In the example of FIG. 7, the calibration signal generator 252 includes a resistive network 258 that includes a first resistor $R_1$ and a second resistor $R_2$ that are each connected to the RF signal source 256 and to a third resistor $R_3$ opposite the RF signal source 256 and interconnecting the first and second resistors $R_1$ and $R_2$. The resistive network 258 can thus provide a divided version of the first calibration signal $CS_1$ that can be provided to the first transmission line cable 56 (e.g., via the switch $SW_1$) in the calibration mode. The transmission line measurement circuit 250 can thus transmit the calibration signal $CS_1$ to the antenna system via the transmission line cable 56.

As described previously, the antenna system can be configured to retransmit the calibration signal $CS_1$ back to the antenna control circuit 50 from the antenna system as respective return signal $RTN_1$ on the transmission line cable 58, such as described in the example of FIG. 4 during the calibration procedure. In the example of FIG. 7, the return signal $RTN_1$ is provided to the signal monitor 254 via a diode $D_1$. The signal monitor 254 is also configured to receive a divided version of the first calibration signal $CS_1$, demonstrated as a signal $CS_{1D}$, via a diode $D_2$. Therefore, as an example, the signal monitor 254 can be configured to measure a power of each of the return signal $RTN_1$ and the signal $CS_{1D}$. As a result, the signal monitor 254 can calculate a power ratio between the return signal $RTN_1$ and the signal $CS_{1D}$. Accordingly, the signal monitor 254 can determine the signal loss exhibited by the transmission line cables 56 and 58 based on the power ratio between the return signal $RTN_1$ and the signal $CS_{1D}$. The power monitor 254 can thus provide the calculated signal loss, demonstrated as a signal PWR_LS, to the memory 76.

While the transmission line measurement circuit 250 is configured to provide the calibration operation demonstrated in the example of FIG. 4, it is to be understood that the transmission line measurement circuit 250 is not limited to the example of FIG. 7. For example, the transmission line measurement circuit 250 can be arranged in a manner to facilitate the calibration signal $CS_1$ and the return signal $RTN_1$ or the calibration signal $CS_2$ and the return signal $RTN_2$ to be propagated along a given one of the transmission line cables 56 and 58, such as described in the example of FIG. 3.

Referring back to the example of FIG. 2, the antenna control circuit 50 also includes a controller 78. In response to the determining the signal loss, the transmission line measurement circuit 70 can provide the determined signal loss, demonstrated in the example of FIG. 2 as "SM", to the controller 78 (e.g., from the memory). In response to the determined signal loss SM, the controller 78 can be configured to adjust an amplitude of at least one of the transmit signals transmitted from the antenna control circuit 50 and the receive signals received at the antenna control circuit 50 based on the determined signal loss. As an example, the controller 78 can include a processor that is configured to determine the appropriate adjustments to the amplitude of each of the respective transmit and receive signals based on the determined signal loss SM. While the controller 78 is described as including a processor, the term "processor" can be used to describe other types of processing devices, such as a field-programmable gate array (FPGA), an application specific integrated circuit (ASIC), or other type of processing device. In the example of FIG. 2, the controller 78 is configured to provide control signals, demonstrated as "$AT_1$" and "$AT_2$", respectively, to the amplitude adjustment circuits 60 and 62 based on the determined signal loss SM, as well as based on whether the signal paths 54 and/or 56 are in the transmit mode or the receive mode.

For example, the communication system 10 can be configured to operate based on a predetermined communication standard that can dictate a predetermined maximum effective isotropic radiated power (EIRP), such as +23 dBm for the transmit signals. Therefore, the controller 78 provides the control signals $AT_1$ and $AT_2$ to the respective amplitude adjustment circuits 60 and 62 in the transmit mode to attenuate the transmit signals down to less than the predetermined maximum EIRP. For example, the antenna arrays 202 and 204 or the antenna arrays 232 and 234 can be designed with sufficiently high gain to provide the transmit signals at a power level that is greater than the predetermined maximum EIRP to overcome power losses of the transmission line cables 56 and 58 regardless of the length of the transmission line cables 56 and 58, such that the transmit signals can be attenuated down to approximately the predetermined maximum EIRP. Additionally or alternatively, the signal paths 52 and 54 can include sufficient power amplification in the transmit mode, as described in greater detail herein, to overcome power losses of the transmission line cables 56 and 58 regardless of the length of the transmission line cables 56 and 58, such that the transmit signals can be attenuated down to approximately the predetermined maximum EIRP. Similarly, the controller 78 provides the control signals $AT_1$ and $AT_2$ to the respective amplitude adjustment circuits 60 and 62 in the receive mode to attenuate the receive signals down to less than an acceptable operational level (e.g., a maximum saturation power associated with the antenna control circuit 50 and/or the user communication system 12). Therefore, the antenna system 14 can be installed in a manner that is substantially agnostic of the length and/or loss characteristics of the transmission line cables 56 and 58 based on the calibration operation to determine the signal loss of the transmission line cables 56 and 58.

In addition, in the example of FIG. 2, the controller 78 can also be configured to provide continuous voltage or tone signal monitoring of the transmission line cables 56 and 58 to determine a fault condition and/or a calibration failure. In response to detecting a fault condition and/or a calibration failure, the controller 78 can each assert respective signals $FLT_1$ and $FLT_2$ that are provided to respective switches $SW_5$ and $SW_6$. The switches $SW_5$ and $SW_6$ can therefore terminate the signal paths 52 and 54 to grounded resistors to provide isolation and/or termination of the signal paths 52 and 54 to separate the antenna system 14 from the user communication equipment 12 in the event of the fault condition and/or the calibration failure. Such a termination of the signal paths 52 and 54 to a load via the switches $SW_5$ and $SW_6$ can also mitigate external unwanted signals from corrupting the calibration. As another example, the controller 78 can instead control an isolation or termination switch in the amplitude adjustment circuits 60 and 62, respectively, for the isolation and/or termination of the signal paths 52 and 54 in the event of a fault condition and/or calibration failure.

In the example of FIG. 2, as one example, the controller 78 can provide a calibration voltage $V_{CAL}$ at the connection "A" to the injection circuit 68. The calibration voltage $V_{CAL}$ is thus transmitted to the antenna system 14 via the transmission line 58, such that the voltage $V_{CAL}$ can be provided back to the antenna control circuit 50 via the transmission line 56 (e.g., via the calibration circuit 205 in the example of FIG. 5). If the controller 78 does not detect the voltage $V_{CAL}$ via the transmission line 56 (e.g., having been provided from the calibration circuit 205), the controller 78 can indicate a fault and/or a calibration failure.

Therefore, the controller 78 can monitor the continuity of the communication system 10, and in the event of a short-circuit or a failure/disconnection of the transmission lines 56 and 58, the controller 78 can remove the voltage thus automatically terminating the antenna system 200 or 230 and can assert the fault signals $FLT_1$ and $FLT_2$ to terminate the user communication equipment 12.

Referring to the example of FIGS. 5 and 6, the antenna systems 200 and 230 each include termination switches $SW_7$ and $SW_8$ to terminate the antenna arrays 202 and 204 or the antenna arrays 232 and 234 in response to the fault signals $FLT_1$ and $FLT_2$. As an example, the controller 78 can initiate a calibration sequence by applying a voltage or tone signal onto the transmission lines 56 and 58. The extraction circuits 206 and 236 can also include a voltage or tone detection circuit that switches the antenna systems 200 and 230 to a calibration state. During the calibration state or the when the voltage $V_{DC}$ is faulted, the antenna systems 200 and 230 can automatically switch the antenna arrays 202 and 204 or the antenna arrays 232 and 234 to a load resistor (e.g., via the switches $SW_7$ and $SW_8$) to prevent transmission during fault conditions and to reduce external interference and unwanted signals from corrupting the calibration.

Referring back to the example of FIG. 2, as described previously, the communication system 10 can operate based on a TDD communication standard, such that the transmit signals and the receive signals can be interleaved with each other on a given signal path between the user communication system 12 and the antenna arrays 202 and 204 or the antenna arrays 232 and 234. In addition, as described previously, the signal paths 52 and 54 of the antenna control circuit 50 can operate in either a transmit mode or a receive mode corresponding to transmission of the transmit signals or receipt of the receive signals in the TDD manner along the respective signal paths 52 and 54. In the example of FIG. 2, the antenna control circuit 50 also includes a first transmit detection circuit 80 associated with the first signal path 52 and a second transmit detection circuit 82 associated with the second signal path 54. The transmit detection circuits 80 and 82 can be configured to measure power on the respective signal paths 52 and 54 to determine if the user communication system 12 is transmitting a transmit signal.

For example, the transmit detection circuits 80 and 82 can each include a bi-directional coupler with a terminated load to determine if the power on the respective one of the signal paths 52 and 54 is greater than a predetermined threshold to determine if the user communication system 12 is transmitting a transmit signal. In the example of FIG. 2, the transmit detection circuits 80 and 82 are configured to generate mode signals $TX_1$ and $TX_2$ that are provided to the controller 78, such as to indicate that the respective one of the signal paths 52 and 54 is in the transmit mode. Therefore, in response to the transmit detection circuits 80 and 82 determining if the user communication system 12 is transmitting a transmit signal, the controller 78 can switch the respective signal paths 52 and 54 from the receive mode as a default mode to a transmit mode to facilitate transmission of the transmit signal from the antenna control circuit 50 via the antenna arrays 202 and 204 or the antenna arrays 232 and 234. Similarly, in response to the transmit detection circuits 80 and 82 detecting a decrease in the power of the signal path (e.g., less than the predetermined threshold), the controller 78 can switch the respective signal paths 52 and 54 back to the receive mode from the transmit mode (e.g., upon expiration of a timer).

As described previously, the controller 78 can be configured to adjust the respective control signal(s) $AT_1$ and $AT_2$ based on the indication of the transmit mode or the receive mode of the respective one of the signal paths 52 and 54, such as based on the respective mode signals $TX_1$ and $TX_2$. Therefore, the amplitude of the transmit and receive signals can be adjusted (e.g., attenuated) based on whether the respective signal path 52 or 54 is in the transmit mode or the receive mode. As another example, as described previously, the amplitude adjustment circuits 60 and 62 can switch between a transmit mode signal path and a receive mode signal path for each of the amplitude adjustment circuits 60 and 62 via switches. Therefore, the controller 78 can also include a switch controller 84 that is configured to control the switches of the amplitude adjustment circuits 60 and 62.

As an example, the switch controller 84 can be configured to generate mode signals $MD_1$ and $MD_2$, respectively, to control the mode of the respective one of the signal paths 52 and 54. For example, the amplitude adjustment circuit 60 can be controlled by the first switching signal $MD_1$ and the amplitude adjustment circuit 62 can be controlled by the second switching signal $MD_2$. In response to one of the transmit detection circuits 80 and 82 determining that the user communication system 12 is transmitting a transmit signal along the respective one of the signal paths 52 and 54, the respective one of the transmit detection circuits 80 and 82 commands the controller 78 (e.g., via the mode signals $TX_1$ and $TX_2$) to provide the respective one of the switching signals $MD_1$ and $MD_2$ to the respective one of the amplitude adjustment circuits 60 and 62. In response to the respective one of the switching signals $MD_1$ and $MD_2$, the respective amplitude adjustment circuits 60 and 62 can activate at least one switch to switch the respective amplitude adjustment circuits 60 or 62 from the default receive mode to the transmit mode to facilitate transmission of the transmit signal along the respective signal path 52 and 54 and from the respective antenna array 58 and 60.

Figure 8:
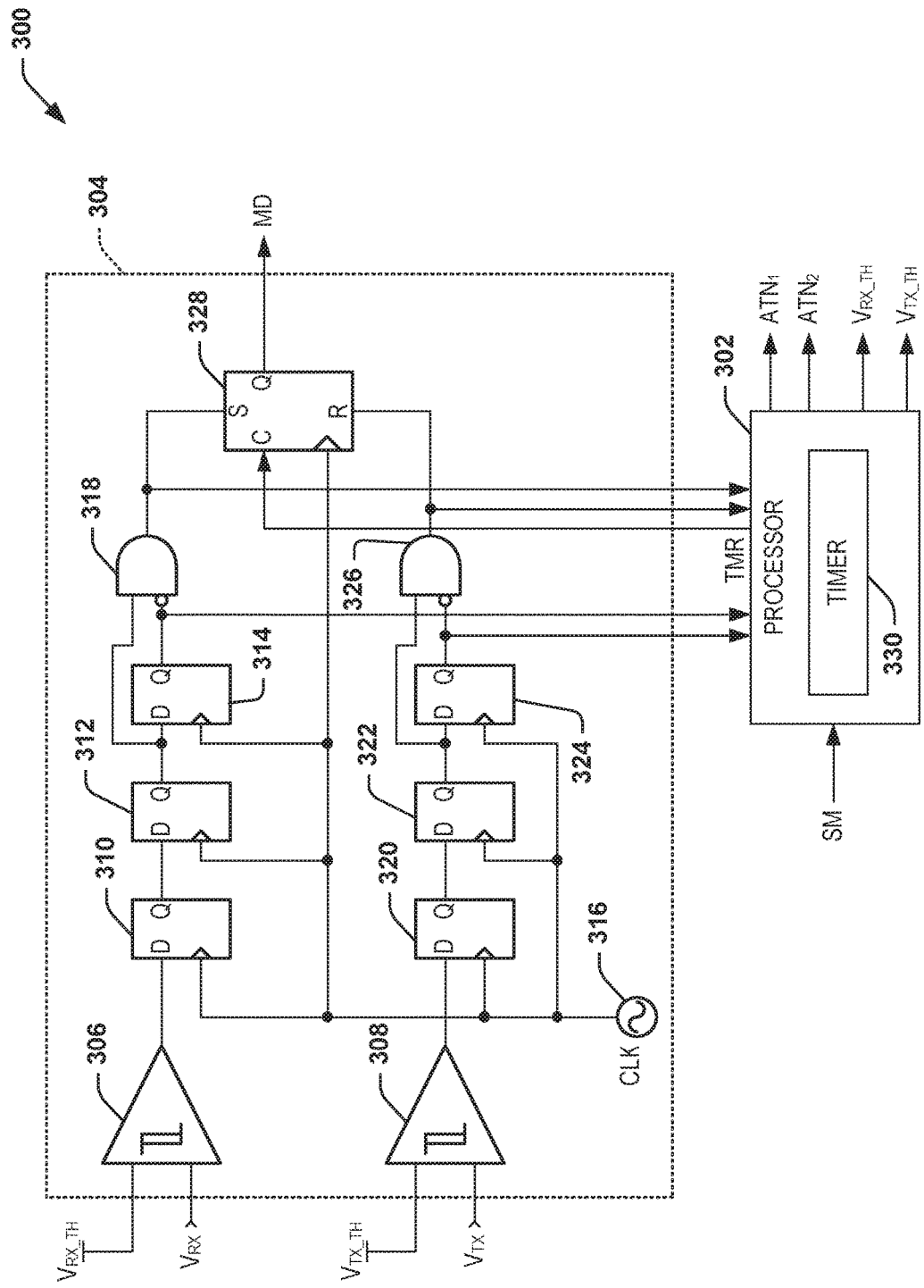
FIG. 8 illustrates an example of a controller.

FIG. 8 illustrates an example of a controller 300. The controller 300 can correspond to the controller 78 in the example of FIG. 2. Therefore, reference is to be made to the example of FIG. 2 in the following description of the example of FIG. 8.

The controller 300 includes a processor 302. For example, the processor 302 can communicate with or include the amplitude adjustment circuits 60 and 62. In the example of FIG. 8, the processor 302 receives the signal SM corresponding to the signal loss of the transmission line cables 56 and 58. Therefore, the processor 302 can be configured to calculate the appropriate amount of amplification (e.g., attenuation) to provide to the amplitude adjustment circuits 60 and 62, such as to provide the appropriate attenuation to the signal paths 52 and/or 54 based on the respective mode (e.g., transmit mode or receive mode). In the example of FIG. 7, the processor 302 is demonstrated as generating the control signals $AT_1$ and $AT_2$ that are provided to the amplitude adjustment circuits 60 and 62, such as to provide the appropriate attenuation to the signal paths 52 and/or 54 based on the respective mode.

As described previously, the controller 78 in the example of FIG. 2 can include the switching controller 94 to control the switches of the amplitude adjustment circuits 60 and 62. In the example of FIG. 8, the controller 300 can include a switching controller 304 that can provide a switching signal MD for one of the amplitude adjustment circuits 60 and 62. Therefore, it is to be understood that the controller 300 can include a switching controller 304 for each of the signal paths 52 and 54. The switching controller 304 includes a first comparator 306 and a second comparator 308. The first comparator 306 is configured to compare a voltage $V_{RX}$ corresponding to an approximate power of the receive signals with a threshold voltage $V_{RX\_TH}$. Similarly, the second comparator 308 is configured to compare a voltage $V_{TX}$ corresponding to an approximate power of the transmit signals with a threshold voltage $V_{TX\_TH}$. As an example, the voltages $V_{RX}$ and $V_{TX}$ can correspond to the same voltage (e.g., corresponding to the signal power on a given one of the signal paths 52 and 54, as measured by the transmit detection system(s) 90 and 92. Therefore, the comparators 306 and 308 can be configured to provide an asserted output corresponding to the mode of the respective signal path 52 or 54.

The switching controller 304 includes a first sequence of D latches (e.g., flip-flops), demonstrated as 310, 312, and 314. The first D latch 310 receives the output of the first comparator 306 as an input, with the D latches 310, 312, and 314 being configured in a cascaded arrangement from output to input. Each of the D latches 310, 312, and 314 receives a clock signal CLK from an oscillator 316. The output of the second D latch 312 and the third D latch 314 are provided as inputs to an AND-gate 318, with the input received from the third D latch 314 being inverted. In a similar arrangement, the switching controller also includes a second sequence of D latches, demonstrated as 320, 322, and 324. The first D latch 320 receives the output of the second comparator 308 as an input, with the D latches 320, 322, and 324 being configured in a cascaded arrangement from output to input. Each of the D latches 320, 322, and 324 likewise receives the clock signal CLK. The output of the second D latch 322 and the third D latch 324 are provided as inputs to an AND-gate 326, with the input received from the third D latch 324 being inverted.

The output of the AND-gate 318 is provided as a set input to an SR latch 328, and the output of the AND-gate 326 is provided as a reset input to the SR latch 328. The SR latch 328 likewise the clock signal CLK, and is configured to generate the respective switching signal MD (e.g., one of the switching signals $MD_1$ and $MD_2$). Therefore, the SR latch 328 is configured to rapidly change the state of the switching signal MD in response to a change in amplitude of the voltages $V_{TX}$ and/or $V_{RX}$. For example, in response to a change of the amplitude of the voltages $V^{TX}$ and/or $V_{RX}$, the logic sequence of the D latches 310, 312, 314, 320, 322, and 324, the AND-gates 318 and 326, and the SR latch 328 can be configured to change the state of the switching signal MD in a time of approximately 10 microseconds or less, such as to satisfy the TDD communication standard.

The processor 302 can be configured to receive a plurality of inputs associated with the switching logic of the switching controller 304. In the example of FIG. 8, the processor 302 receives as inputs the output of the D latches 314 and 324, as well as the outputs of the AND-gates 318 and 326. For example, the processor 302 can be configured as a state machine to monitor the state of the signal path (e.g., the signal path 52 or 54), such that the inputs to the inputs to the processor 302 are configured to set flags and/or registers for operation of the antenna control circuit 50. As another example, the oscillator 316 can be included in the processor 302, such that the processor 302 generates the clock signal CLK. Additionally, the processor 302 is demonstrated as generating the predetermined threshold voltages $V_{TX\_TH}$ and $V_{RX\_TH}$, which can be programmable via input to the processor 302, or can have fixed voltage amplitudes.

In the example of FIG. 8, the processor 302 includes timers 330 (e.g., one for each of the signal paths 52 and 54). As an example, the timers 330 can correspond to watchdog timers for controlling timing associated with the mode selection of the respective signal paths 52 and 54. For example, in response to the inputs provided to the processor 302 indicating that the mode is set for transmit mode for a given one of the signal path(s) 52 and 54, but the transmit power is less than the predetermine threshold (e.g., the voltage $V_{TX}$ is less than the predetermined threshold $V_{TX\_TH}$), the respective timer 330 can begin counting a predetermined timing threshold. As an example, in response to the respective tinier 330 counting for a predetermined time duration (e.g., approximately one millisecond), the processor 302 can switch back to a default receive mode for the given signal path 52 or 54 such as to change the amplitude of the respective one of the control signals $AT_1$ and $AT_2$. Additionally, the processor 302 can assert an output to the SR latch 328 (e.g., to a "clear" input of the SR latch 328). Therefore, the SR latch 328 can reset to change the state of the switching signal MD to indicate switching the mode from the transmit mode back to the receive mode. As a result, the signal path(s) 52 and/or 54 can be returned to the default receive mode in response to the timed indication of no more transmit signals being transmitted from the user communication system 12.

Figure 9:
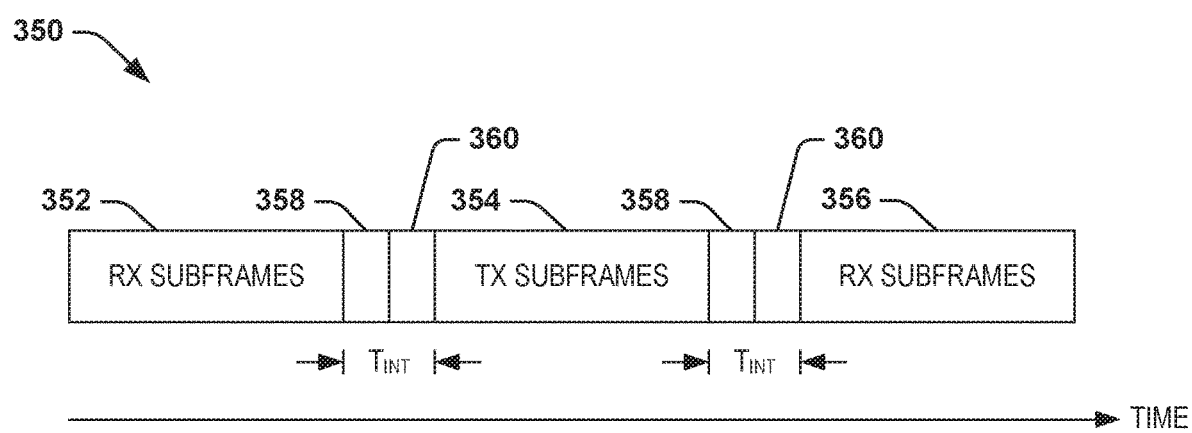
FIG. 9 illustrates an example of a TDD communication stream.

In order to satisfy a given TDD communication standard, the control signals $AT_1$ and $AT_2$ and the amplitude adjustment circuits 60 and 62 may be required to switch between the transmit mode and the receive mode as quickly as possible. FIG. 9 illustrates an example diagram 350 of a TDD communication stream. The TDD communication stream includes a first set of receive signal sub-frames, demonstrated at 352, a first set of transmit signal sub-frames, demonstrated at 354, and a second set of receive mode sub-frames 356. As an example, the TDD communication stream can continue thereafter with alternating sets of transmit signal sub-frames and receive signa sub-frames in a TDD manner. The transmit and receive signal sub-frames are demonstrated in the example of FIG. 9 as being demonstrated as a function of time. While each of the transmit and receive signal sub-frames are demonstrated as being approximately equal in time, it is to be understood that the transmit and receive signal sub-frames are not necessarily equal in length of time, and that the elements of the time domain demonstrated in the example of FIG. 9 are not necessarily illustrated to scale.

In the example of FIG. 9, between each of the sets of receive signal sub-frames (e.g., the receive signal sub-frames 352) and transmit signal sub-frames (e.g., the transmit signal sub-frames 354) is a time $T_{INT}$. The time $T_{INT}$ can, for example, correspond to a substantial maximum intermediate time between propagation of the receive signal sub-frames and the transmit signal sub-frames on a given signal path, such as between the user communication system 12, along a transmission line cable 56 or 58, along a respective signal path 52 or 54 in the antenna control circuit 50, and a respective one of the antenna arrays 202 or 204, such as defined by the predetermined TDD communication standard.

In the example of FIG. 9, the time $T_{INT}$ between each of the transmit and receive signal sub-frames includes a first portion of time 358 and a second portion of time 360. The first portion of time 358 can correspond to a switching time (e.g., approximately 10 microseconds or less), such as to generate the appropriate switching signal(s) $MD_1$ and $MD_2$ and/or to activate the respective switches of the amplitude adjustment circuits 60 and 62. The second portion of time 360 can correspond to switch settling time (e.g., likewise approximately 10 microseconds or less), such as a time for the respective switches to settle to a saturation region and/or to dissipate parasitic effects (e.g., capacitance and/or inductance) of the circuit components of the switching controller 304 and/or the respective amplitude adjustment circuits 60 and 62. Therefore, the hardware-based logic circuit of the switching controller 304 can implement rapid state-changes of the switching signal(s) $MD_1$ and $MD_1$ to satisfy the rapid switching requirements dictated by the TDD communication standard.

FIGS. 10-15 demonstrate examples of amplitude adjustment circuits. The example of FIG. 10 demonstrates an amplitude adjustment circuit 370, the example of FIG. 11 demonstrates an amplitude adjustment circuit 400, the example of FIG. 12 demonstrates an amplitude adjustment circuit 450, the example of FIG. 13 demonstrates an amplitude adjustment circuit 500, the example of FIG. 14 demonstrates an amplitude adjustment circuit 550, and the example of FIG. 15 demonstrates an amplitude adjustment circuit 600. Any of the amplitude adjustment circuits 370, 400, 450, 500, 550, and 600 can correspond to the amplitude adjustment circuits 60 and 62 in the example of FIG. 2. Therefore, reference is to be made to the example of FIG. 2 in the following description of the examples of FIGS. 10-15.

Additionally, the amplitude adjustment circuits 370, 400, 450, 500, 550, and 600 are not limited to the examples demonstrated in the examples of FIGS. 10-15. For example, the amplitude adjustment circuits 370, 400, 450, 500, 550, and 600 can include filters, such as low-noise filters, band-pass filters, and the like that can be arranged in the respective transmit path, receive path, or both. As another example, the amplitude adjustment circuits 370, 400, 450, 500, 550, and 600 described in the examples of FIGS. 10-15 are not limited to providing amplification in each of the transmit path and receive path, but can instead include a signal bypass path (e.g., zero gain) in either the transmit path or the receive path. As another example, each of the amplitude adjustment circuits 370, 400, 450, 500, 550, and 600 can include isolation or termination switches (not shown), such as controlled via the transmit detection circuits 80 and 82, to provide isolation and/or termination of the respective signal paths 52 and 54 to separate the antenna system 14 from the user communication equipment 12 in the event of a fault condition and/or a calibration failure. Furthermore, the switches described in the amplitude adjustment circuits 400, 450, 500, 550, and 600 can be implemented as transistor devices, such as to provide very rapid switching times between the transmit mode and the receive mode.

Figure 10:
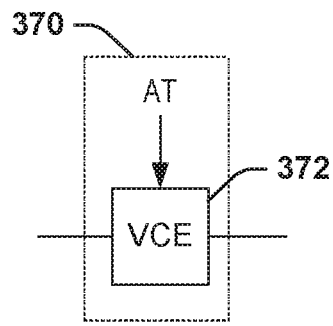
FIG. 10 illustrates an example of an amplitude adjustment circuit.

In the example of FIG. 10, the amplitude adjustment circuit 370 includes a VCE 372 in the signal path (e.g., the signal path 52 or 54). The VCE 372 is demonstrated as being controlled by a control signal AT (e.g., one of the control signals $AT_1$ or $AT_2$). For example, the VCE 372 can be configured as a variable attenuator that is controlled by the controller 78 to provide attenuation of the transmit signals in the transmit mode and to provide attenuation of the receive signals in the receive mode (e.g., based on a respective one of the mode signals $TX_1$ or $TX_2$). Therefore, the mode of the amplitude adjustment circuit 370 is controlled by the amount of adjustment (e.g., attenuation) provided by the control signal AT in each of the transmit mode and the receive mode.

Figure 11:
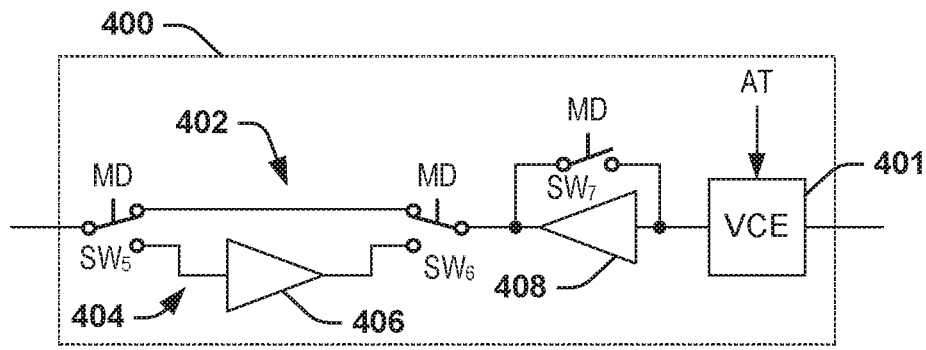
FIG. 11 illustrates another example of an amplitude adjustment circuit.

In the example of FIG. 11, the amplitude adjustment circuit 400 includes a VCE 401 in the signal path (e.g., the signal path 52 or 54). The VCE 401 is demonstrated as being controlled by a control signal AT (e.g., one of the control signals $AT_1$ or $AT_2$). For example, the VCE 401 can be configured as a variable attenuator that is controlled by the controller 78 to provide attenuation of the transmit signals in the transmit mode and to provide attenuation of the receive signals in the receive mode (e.g., based on a respective one of the mode signals $TX_1$ or $TX_2$). The amplitude adjustment circuit 400 also includes first switch $SW_5$, a second switch $SW_6$, and a third switch $SW_7$ that are each controlled by the switching signal MD. The switches $SW_5$, $SW_6$, and $SW_7$ are demonstrated in a default state corresponding to the default state of the receive mode. The first and second switches $SW_5$ and $SW_6$ are each demonstrated in the example of FIG. 11 as single-pole double-throw switches that select between a first signal path, demonstrated at 402, and a second signal path, demonstrated at 404. In the example of FIG. 11, the first signal path 402 can correspond to the receive mode and the second signal path 404 can correspond to the transmit mode. The second signal path 404 includes a power amplifier 406 that is configured to amplify the transmit signal in the transmit mode. Additionally, the amplitude adjustment circuit 400 includes a low-noise amplifier (LNA) 408 that is arranged in parallel with the third switch $SW_7$, arranged as a single-pole single-throw switch. Therefore, in the receive mode, the receive signal is amplified by the LNA 408, and in the transmit mode, the transmit signal is provided in a bypass short-circuit through the closed switch $SW_7$.

Figure 12:
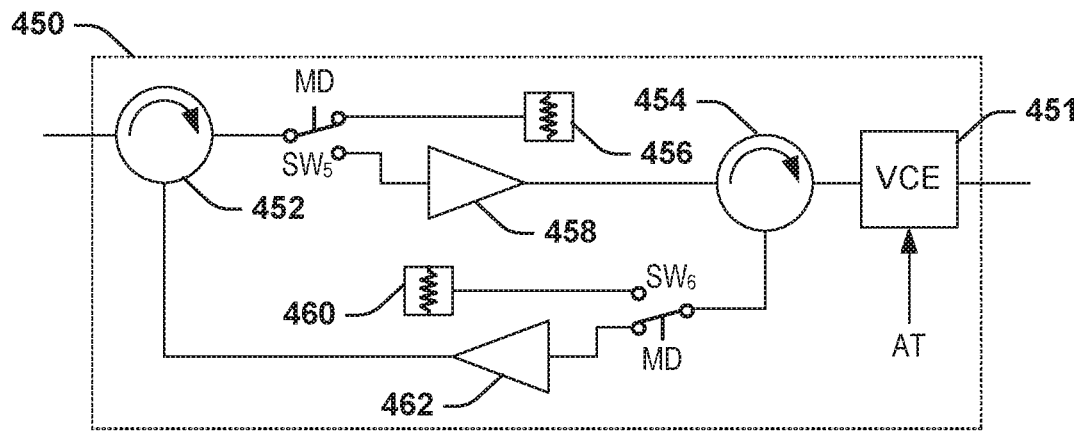
FIG. 12 illustrates another example of an amplitude adjustment circuit.

In the example of FIG. 12, the amplitude adjustment circuit 450 includes a VCE 451 in the signal path (e.g., the signal path 52 or 54). The VCE 451 is demonstrated as being controlled by a control signal AT (e.g., one of the control signals $AT_1$ or $AT_2$). For example, the VCE 451 can be configured as a variable attenuator that is controlled by the controller 78 to provide attenuation of the transmit signals in the transmit mode and to provide attenuation of the receive signals in the receive mode (e.g., based on a respective one of the mode signals $TX_1$ or $TX_2$). The amplitude adjustment circuit 450 also includes a first circulator 452, a second circulator 454, a first switch $SW_5$, and a second switch $SW_6$ that are each controlled by the switching signal MD. The switches $SW_5$ and $SW_6$ are demonstrated in a default state corresponding to the default state of the receive mode. The first and second switches $SW_5$ and $SW_6$ are each demonstrated in the example of FIG. 11 as single-pole double-throw switches. The first circulator 452 is demonstrated as a "clockwise" circulator, such that the transmit signal is provided to the first switch $SW_5$. The first switch $SW_5$ selects between an attenuator 456 in the receive mode and a power amplifier 458 in the transmit mode, and thus is output from the amplitude adjustment circuit 450 via the second circulator 454 that is also arranged as a "clockwise" circulator. The second circulator 454 also provides the receive signal to the second switch $SW_6$. The second switch $SW_6$ selects between an attenuator 460 in the transmit mode and an LNA 462 in the receive mode, and thus is output from the amplitude adjustment circuit 450 via the first circulator 452.

Figure 13:
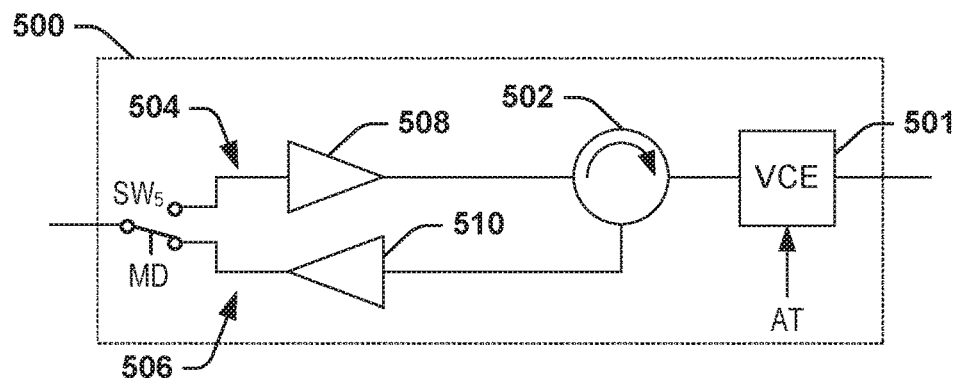
FIG. 13 illustrates another example of an amplitude adjustment circuit.

In the example of FIG. 13, the amplitude adjustment circuit 500 includes a VCE 501 in the signal path (e.g., the signal path 52 or 54). The VCE 501 is demonstrated as being controlled by a control signal AT (e.g., one of the control signals $AT_1$ or $AT_2$). For example, the VCE 501 can be configured as a variable attenuator that is controlled by the controller 78 to provide attenuation of the transmit signals in the transmit mode and to provide attenuation of the receive signals in the receive mode (e.g., based on a respective one of the mode signals $TX_1$ or $TX_2$). The amplitude adjustment circuit 500 also includes a switch $SW_5$ and a circulator 502. The switch $SW_5$ is arranged as a single-pole double-throw switch controlled by the switching signal MD, and is demonstrated in a default state corresponding to the default state of the receive mode. The switch $SW_5$ selects between a first signal path, demonstrated at 504, and a second signal path, demonstrated at 506. In the example of FIG. 13, the first signal path 504 can correspond to the transmit mode and the second signal path 506 can correspond to the receive mode. The first signal path 504 includes a power amplifier 508 that is configured to amplify the transmit signal in the transmit mode, and thus is output from the amplitude adjustment circuit 500 via the circulator 502 that is also arranged as a "clockwise" circulator. The second signal path 506 includes an LNA 510, such that the circulator 502 provides the receive signal on the second signal path 506 to be amplified by the LNA 510 and output from the amplitude adjustment circuit 500 via the switch $SW_5$ in the receive mode.

Figure 14:
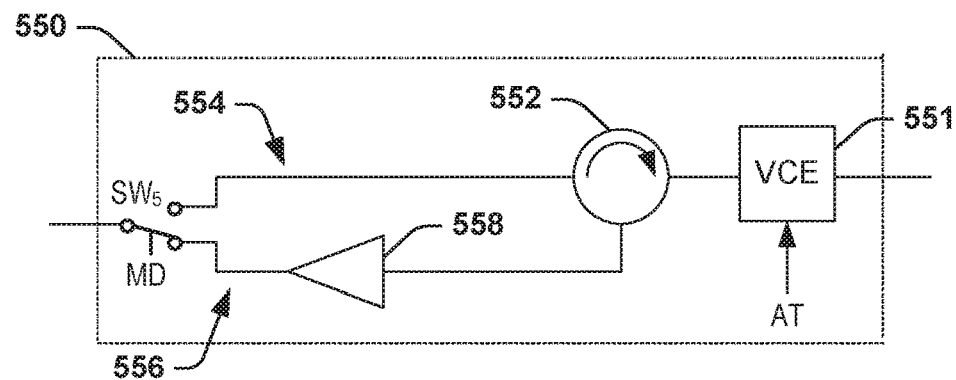
FIG. 14 illustrates another example of an amplitude adjustment circuit.

In the example of FIG. 14, the amplitude adjustment circuit 550 includes a VCE 551 in the signal path (e.g., the signal path 52 or 54). The VCE 551 is demonstrated as being controlled by a control signal AT (e.g., one of the control signals $AT_1$ or $AT_2$). For example, the VCE 551 can be configured as a variable attenuator that is controlled by the controller 78 to provide attenuation of the transmit signals in the transmit mode and to provide attenuation of the receive signals in the receive mode (e.g., based on a respective one of the mode signals $TX_1$ or $TX_2$). The amplitude adjustment circuit 550 also includes a switch $SW_5$ and a circulator 552. The switch $SW_5$ is arranged as a single-pole double-throw switch controlled by the switching signal MD, and is demonstrated in a default state corresponding to the default state of the receive mode. The switch $SW_5$ selects between a first signal path, demonstrated at 554, and a second signal path, demonstrated at 556. In the example of FIG. 14, the first signal path 554 can correspond to the transmit mode and the second signal path 556 can correspond to the receive mode. The first signal path 554 is demonstrated as a bypass short-circuit to output the transmit signal from the amplitude adjustment circuit 550 via the circulator 552 that is also arranged as a "clockwise" circulator. The second signal path 556 includes an LNA 558, such that the circulator 552 provides the receive signal on the second signal path 556 to be amplified by the LNA 558 and output from the amplitude adjustment circuit 550 via the switch $SW_5$ in the receive mode.

Figure 15:
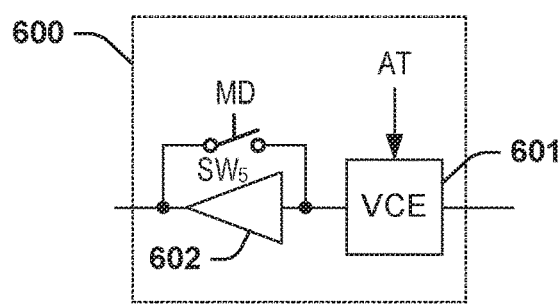
FIG. 15 illustrates another example of an amplitude adjustment circuit.

In the example of FIG. 15, the amplitude adjustment circuit 600 includes a VCE 601 in the signal path (e.g., the signal path 52 or 54). The VCE 601 is demonstrated as being controlled by a control signal AT (e.g., one of the control signals $AT_1$ or $AT_2$). For example, the VCE 601 can be configured as a variable attenuator that is controlled by the controller 78 to provide attenuation of the transmit signals in the transmit mode and to provide attenuation of the receive signals in the receive mode (e.g., based on a respective one of the mode signals $TX_1$ or $TX_2$). The amplitude adjustment circuit 600 also includes a switch $SW_5$ controlled by the switching signal MD. The switch $SW_5$ is demonstrated as a single-pole single-throw switch in a default state corresponding to the default state of the receive mode. The amplitude adjustment circuit 600 includes an LNA 602 that is arranged in parallel with the switch $SW_5$. Therefore, in the receive mode, the receive signal is amplified by the LNA 602, and in the transmit mode, the transmit signal is provided in a bypass short-circuit through the closed switch $SW_5$.

The examples of FIGS. 10, 14, and 15 do not include power amplifiers to provide amplification of the transmit signals in the transmit mode. As described previously, the signal paths 52 and 54 can include sufficient power amplification in the transmit mode, such as provided in the examples of FIGS. 11-13 to overcome power losses of the transmission line cables 56 and 58 regardless of the length of the transmission line cables 56 and 58 (e.g., to attenuate the transmit signals down to approximately the predetermined maximum EIRP). As another example, the amplitude adjustment circuits 370, 550, and 600 in the examples of FIGS. 10, 14, and 15, respectively, can be implemented when the user communication system 12 includes sufficient power amplification of the transmit signals that power amplifiers are not necessary in the transmit signal paths. Additionally or alternatively, the antenna arrays 202 and 204 or the antenna arrays 232 and 234 can be designed with sufficiently high gain that power amplification of the transmit signals is not necessary in the transmit signal paths to provide feasibility of the amplitude adjustment circuits 550 and 600.

As another example, the amplitude adjustment circuits 400, 450, and 500 can be implemented for installation of an antenna system 14 in a manner that is completely agnostic of the user communication system 12. For example, during the calibration procedure, in addition to measuring the signal loss of the transmission line cables 56 and 58, the antenna control circuit 50 can measure an output power of the transmit signals provided from the user communication system 12 (e.g., via the transmit detection circuits 80 and 82, such as relative to a plurality of thresholds). Therefore, in response to determining the output power of the user communication system 12, the antenna control circuit 50 can properly attenuate the transmit signals in the transmit mode down to approximately the predetermined maximum EIRP.

As a result, the switching controller 304 can implement state changes of the switching signal MD in response to changes of amplitude of the voltages $V_{TX}$ and/or $V_{RX}$, such as in response to the transmit detection circuit(s) 80 and 82 detecting changes in power on the respective signal path(s) 52 and 54. Accordingly, the switching signals $MD_1$ and $MD_2$ can provide sufficiently rapid switching to satisfy the maximum switching times (e.g., the first portion of time 558 in the example of FIG. 9) to comply with the TDD communication standard. As a result, the antenna control circuit 50 can operate to facilitate the bidirectional TDD communications between transmit and receive signals, such as without requiring communication or signal transfer from the user communication system 12. Therefore, the antenna system 14 can be installed in a simplistic manner that is largely independent of the operation of the user communication system 12. Additionally, the antenna system 14 can be installed in a manner that is agnostic of the length of the transmission line cable(s) 56 and 58 interconnecting the antenna control circuit 50 and the user communication system 12. Accordingly, the antenna control circuit 50 can be simplistically installed to efficiently facilitate wireless communication between the user communication system 12 and a network hub (e.g., a base station).

Figure 16:
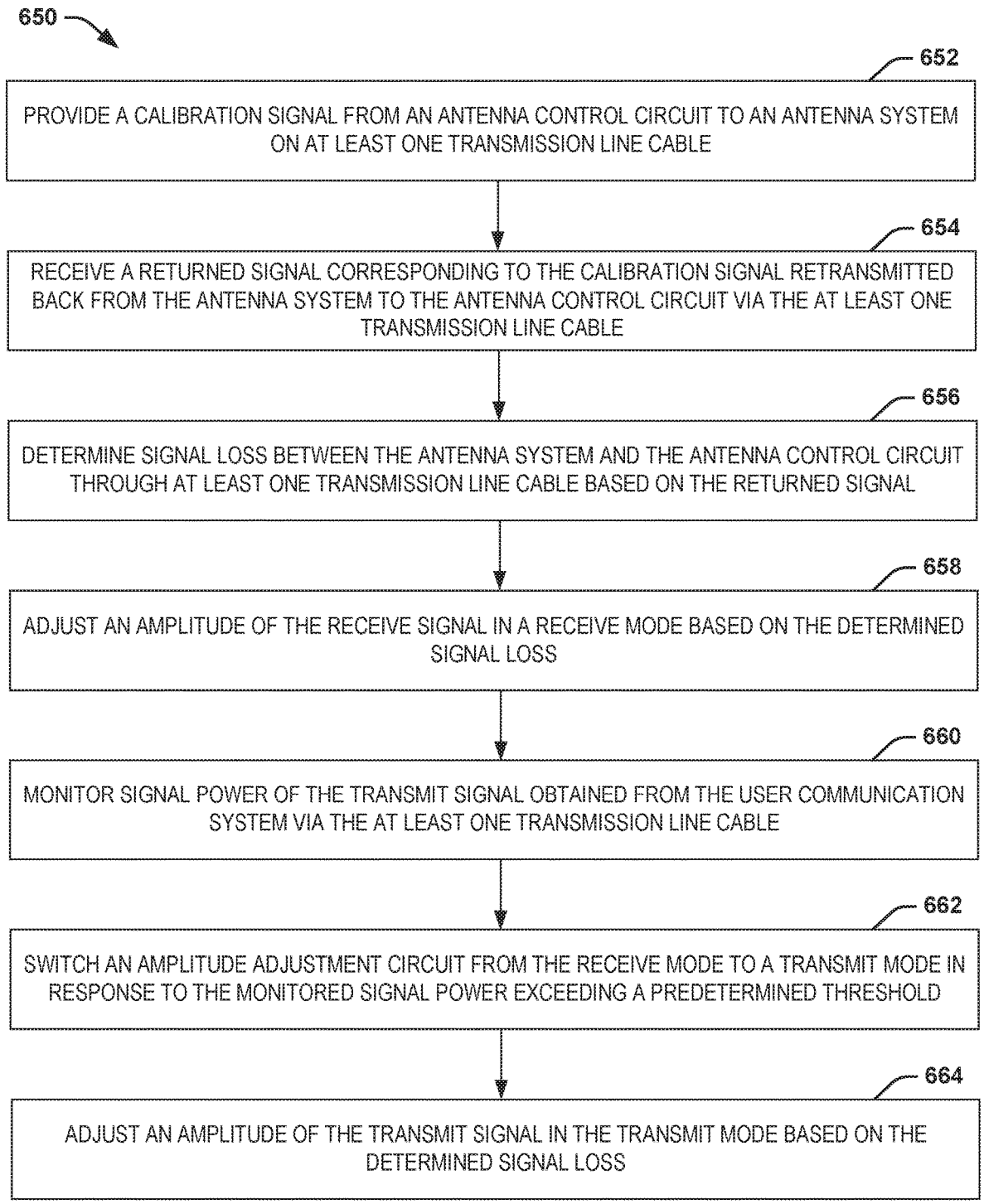
FIG. 16 illustrates an example of a method for communicating at least one of a transmit signal and a receive signal via a time-division duplex (TDD) antenna system comprising an antenna.

In view of the foregoing structural and functional features described above, a methodology in accordance with various aspects of the present invention will be better appreciated with reference to FIG. 16. While, for purposes of simplicity of explanation, the methodology of FIG. 16 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 16 illustrates an example of a method 650 for communicating at least one of a transmit signal and a receive signal via a TDD antenna communication system (e.g., the communication system 10) comprising an antenna system (e.g., the antenna system 14). At 652, a calibration signal (e.g., the calibration signal(s) $CS_1$ and/or $CS_2$) is provided from an antenna control circuit (e.g., the antenna control circuit 13) to the antenna system on at least one transmission line cable (e.g., the transmission line cable(s) 16). At 654, a returned signal (e.g., the return signal(s) $RTN_1$ and $RTN_2$) corresponding to the calibration signal retransmitted back from the antenna system is received at the antenna control circuit on the at least one transmission line cable. At 656, signal loss between the antenna system and the antenna control circuit through at least one transmission line cable is determined (e.g., via the transmission line measurement circuit 22) based on the returned signal. At 658, an amplitude of the receive signal received via the at last one transmission line cable is adjusted in a receive mode based on the determined signal loss. At 660, signal power of the transmit signal obtained from the user communication system via the at least one transmission line cable is monitored (e.g., via the transmit detection circuit 28). At 662, an amplitude adjustment circuit (e.g., the amplitude adjustment circuit 24) is switched from the receive mode to a transmit mode (e.g., via the controller 26) in response to the monitored signal power exceeding a predetermined threshold. At 664, an amplitude of the transmit signal is adjusted in the transmit mode based on the determined signal loss.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A self-synchronizing time-division duplex (TDD) antenna communication system comprising:
    an antenna system configured to communicate a transmit signal and a receive signal;
    an antenna control circuit coupled to a user communication system and the antenna system; and
    at least one transmission line cable,
    wherein:
    the antenna control circuit is coupled to the antenna system via the at least one transmission line cable, and
    the antenna control circuit comprises:
        a transmission line measurement circuit configured to determine signal loss between the antenna system and the antenna control circuit through the at least one transmission line cable;
        an amplitude adjustment circuit configured to adjust amplitude of at least one of the transmit and receive signals based on the determined signal loss;
        a transmit detection circuit configured to monitor signal power along a signal path within the antenna control circuit and to generate a transmit mode signal, based on the signal power; and
        a controller configured to receive the transmit mode signal from the transmit detection circuit, to generate a mode signal and provide the mode signal to the amplitude adjustment circuit to switch the amplitude adjustment circuit from a receive mode to a transmit mode in response to the monitored signal power exceeding a predetermined threshold, the controller further configured to generate a control signal and provide the control signal to the amplitude adjustment circuit, wherein, based on the control signal, in the receive mode the amplitude adjustment circuit applies a receive amplitude adjustment along the signal path to the receive signal, and in the transmit mode the amplitude adjustment circuit applies a transmit amplitude adjustment along the signal path to the transmit signal.

2. The system of claim 1, wherein in the receive mode the amplitude adjustment circuit adjusts the amplitude of the receive signal obtained via the at least one transmission cable and provides the adjusted receive signal to the user communication system, and in the transmit mode the amplitude adjustment circuit adjusts the amplitude of the transmit signal and provides the adjusted transmit signal to the antenna system via the at least one transmission cable.

3. The system of claim 1, wherein the transmission line measurement circuit comprises:
    a calibration signal generator configured to provide a calibration signal on the at least one transmission line cable from the antenna control circuit to the antenna system, the calibration signal being retransmitted back from the antenna system to the antenna control circuit as a returned signal; and
    a signal monitor configured to detect a characteristic of the returned signal and to determine the signal loss based on the characteristic of the returned signal.

4. The system of claim 3, wherein the calibration signal generator provides the calibration signal in response to one of a change in amplitude of a DC control voltage or a tone signal provided on the at least one transmission line cable.

5. The system of claim 3, wherein the signal monitor is configured to measure a first power associated with the calibration signal provided on the at least one transmission line cable and to measure a second power associated with the returned signal on the at least one transmission line cable to determine the signal loss as a ratio of the first power and the second power.

6. The system of claim 5, wherein the at least one transmission line cable comprises a first transmission line cable and a second transmission line cable, wherein the signal monitor is configured to measure the first power associated with the calibration signal provided on the first transmission line cable and to measure the second power associated with the returned signal received on the second transmission line cable.

7. The system of claim 1, wherein the antenna system comprises an extraction circuit configured to receive DC power from the antenna control circuit via the at least one transmission line cable.

8. The system of claim 1, wherein the controller is further configured to switch from the transmit mode to the receive mode in response to the monitored signal power being below the predetermined threshold.

9. The system of claim 1, wherein:
    the transmit signal is a first transmit signal and the receive signal is a first receive signal;
    the antenna system comprises a first antenna array to communicate the first transmit signal and the first receive signal, and further comprises a second antenna array to communicate a second transmit signal and a second receive signal;
    the signal path of the amplitude adjustment circuit is a first signal path;
    the amplitude adjustment circuit is a first amplitude adjustment circuit;
    the receive amplitude adjustment is a first receive amplitude adjustment;
    the transmit amplitude adjustment is a first transmit amplitude adjustment;
    the receive mode is a first receive mode;
    the transmit mode is a first transmit mode; and
    in a second receive mode a second amplitude adjustment circuit applies a second receive amplitude adjustment along a second signal path to the second receive signal, and in a second transmit mode a second amplitude adjustment circuit applies a second transmit amplitude adjustment along the second signal path to the second transmit signal.

10. The system of claim 9, wherein:
    the at least one transmission line cable includes a first transmission line cable and a second transmission line cable; and
    the antenna control circuit communicates the first receive signal and the first transmit signal with the antenna system via the first transmission line cable, and communicates the second receive signal and the second transmit signal with the antenna system via the second transmission line cable.

11. The system of claim 1, wherein the antenna control circuit further comprises a memory to store the determined signal loss.

12. The system of claim 1, wherein the transmit detection circuit comprises a directional coupler and power detector to monitor the signal power of the transmit signal.

13. A method for communicating at least one of a transmit signal in a transmit mode and a receive signal in a receive mode via a time-division duplex (TDD) antenna communication system comprising an antenna system, the method comprising:
providing a calibration signal from an antenna control circuit to the antenna system on at least one transmission line cable;
receiving a returned signal corresponding to the calibration signal retransmitted back from the antenna system to the antenna control circuit on the at least one transmission line cable;
determining signal loss between the antenna system and the antenna control circuit through the at least one transmission line cable based on the returned signal;
monitoring, by a transmit detection circuit, a signal power of the transmit signal obtained from a user communication system along a signal path within the antenna control circuit and generating a transmit mode signal based on the signal power;
receiving, by the controller connected to the transmit detection circuit, the transmit mode signal from the transmit detection circuit to generate a mode signal and to provide the mode signal to an amplitude adjustment circuit;
switching the amplitude adjustment circuit from the receive mode to the transmit mode in response to the mode signal indicating the monitored signal power exceeding a predetermined threshold;
generating, by the controller a control signal and providing the control signal to the amplitude adjustment circuit; and
applying, by the amplitude adjustment circuit and in response to the control signal, a receive amplitude adjustment in the receive mode along the signal path to the receive signal based on the determined signal loss and applying, by the amplitude adjustment circuit, a transmit amplitude adjustment in the transmit mode along the signal path to the transmit signal based on the determined signal loss.

14. The method of claim 13, wherein determining signal loss comprises:
detecting a characteristic of the returned signal; and
determining the signal loss based on the characteristic of the returned signal.

15. The method of claim 13, wherein providing the calibration signal comprises providing the calibration signal in response to a calibration command.

16. The method of claim 13, wherein determining signal loss comprises:
measuring a first power associated with the calibration signal provided on the at least one transmission line cable; and
measuring a second power associated with the returned signal on the at least one transmission line cable to determine the signal loss as a ratio of the first power and the second power.

17. The method of claim 16, wherein the at least one transmission line cable comprises a first transmission line cable and a second transmission line cable, wherein measuring the first power comprises measuring the first power associated with the calibration signal provided on the first transmission line cable and measuring the second power comprises measuring the second power associated with the returned signal received on the second transmission line cable.

18. The method of claim 13, further comprising switching from the transmit mode to the receive mode in response to the monitored signal power being below the predetermined threshold.

19. The method of claim 13, wherein:
the transmit signal is a first transmit signal and the receive signal is a first receive signal;
the antenna system comprises a first antenna array to communicate the first transmit signal and the first receive signal, and further comprises a second antenna array to communicate a second transmit signal and a second receive signal;
the amplitude of the receive signal comprises a first amplitude of the first receive signal;
the receive mode comprises a first receive mode;
the determined signal loss comprises a first determined signal loss;
the signal power comprises a first signal power;
the amplitude adjustment circuit comprises a first amplitude adjustment circuit; and
the transmit mode comprises a first transmit mode, the method further comprising:
adjusting a second amplitude of a second receive signal received via the at least one transmission line cable in a second receive mode based on a second determined signal loss;
monitoring a second signal power of a second transmit signal obtained from the user communication system;
switching a second amplitude adjustment circuit from the second receive mode to a second transmit mode in response to the monitored second signal power exceeding the predetermined threshold; and
adjusting a second amplitude of the second transmit signal in the second transmit mode based on the determined signal loss.

20. The method of claim 19, wherein the at least one transmission line cable comprises:
a first transmission line cable on which the first receive signal and the first transmit signal are communicated between the antenna system and the antenna control circuit; and
a second transmission line cable on which the second receive signal and the second transmit signal are communicated between the antenna control circuit and the antenna system.

21. The method of claim 13, further comprising storing the determined signal loss in a memory.

22. The method of claim 13, wherein monitoring the signal power of the transmit signal comprises monitoring the signal power of the transmit signal via a directional coupler and a power detector.

23. The system of claim 1, wherein the antenna system is configured to communicate the transmit signal and the receive signal to and from the user communication system without active control communication between the antenna system and the user communication system, wherein the antenna system operates to facilitate bidirectional time division duplex communication between transmit and receive signals without requiring communication or signal transfer from the user communication system.

24. The method of claim 13, wherein the antenna system is configured to communicate the transmit signal and the receive signal to and from the user communication system without active control communication between the antenna system and the user communication system, wherein the antenna system operates to facilitate bidirectional time division duplex communication between transmit and receive signals without requiring communication or signal transfer from the user communication system.

\* \* \* \* \*